June 18, 1968   C. E. KURTZ   3,388,569
HYDRAULIC TRANSMISSION FOR FABRIC-TREATING MACHINE
Original Filed May 9, 1966   14 Sheets-Sheet 1

INVENTOR
CURTIS E. KURTZ
BY
ATTORNEY

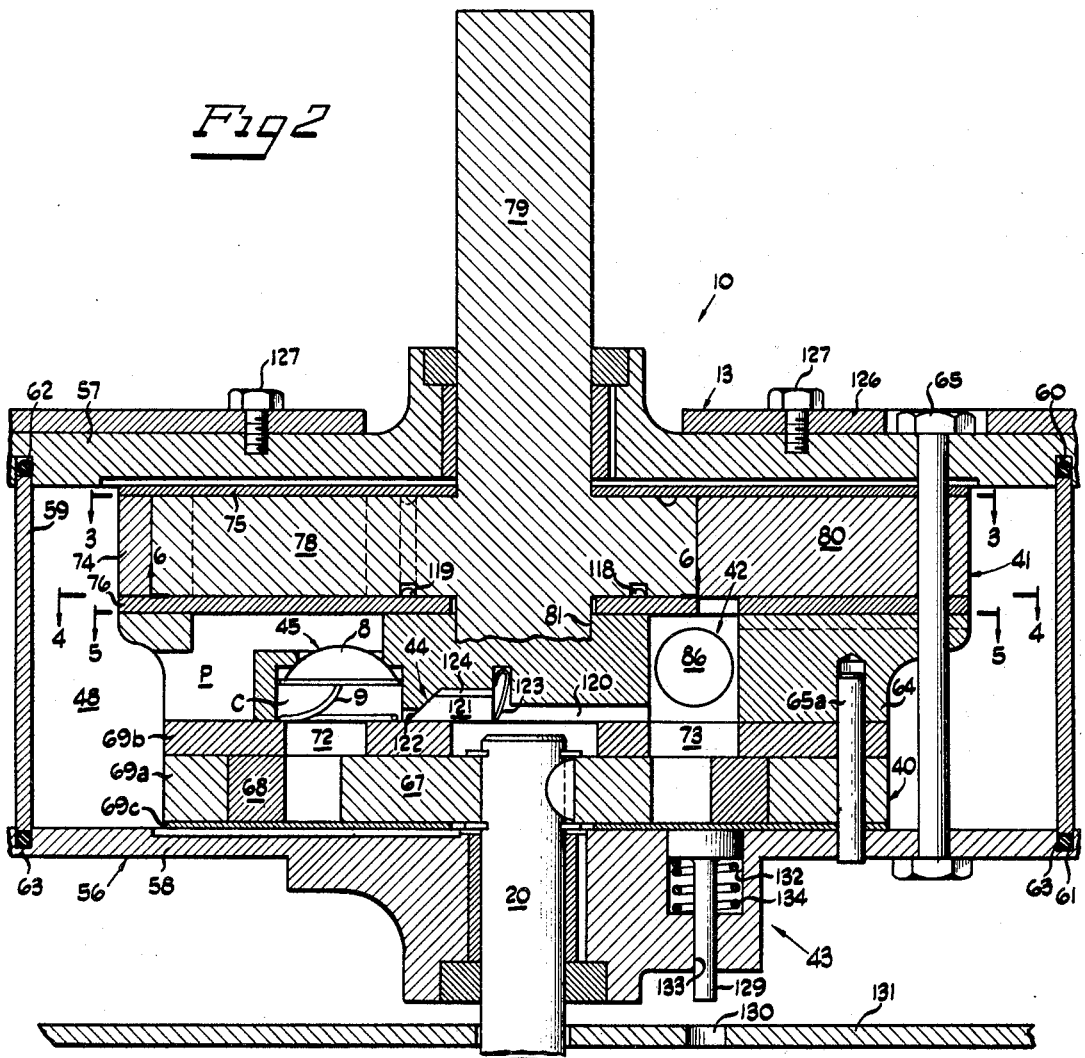

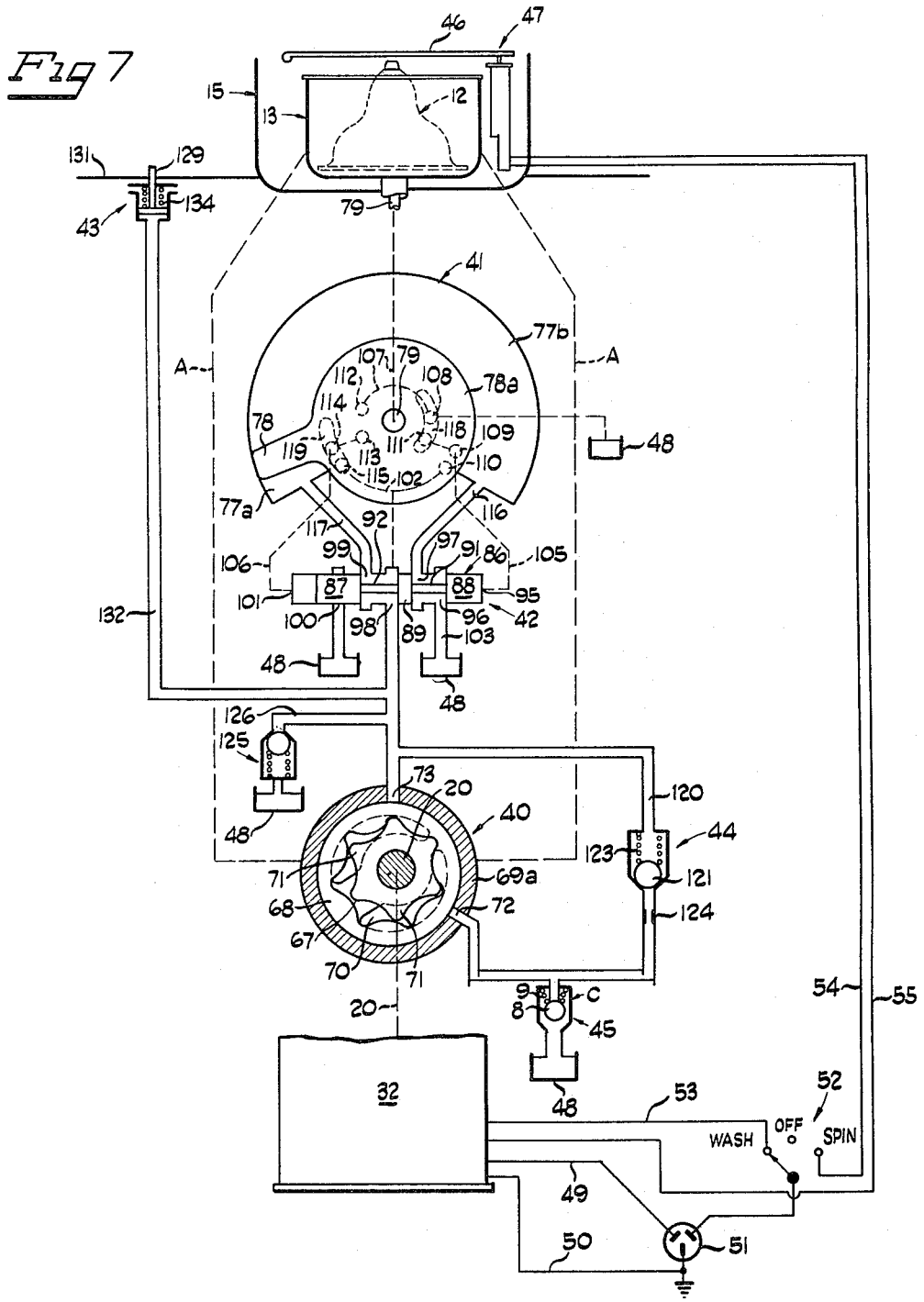

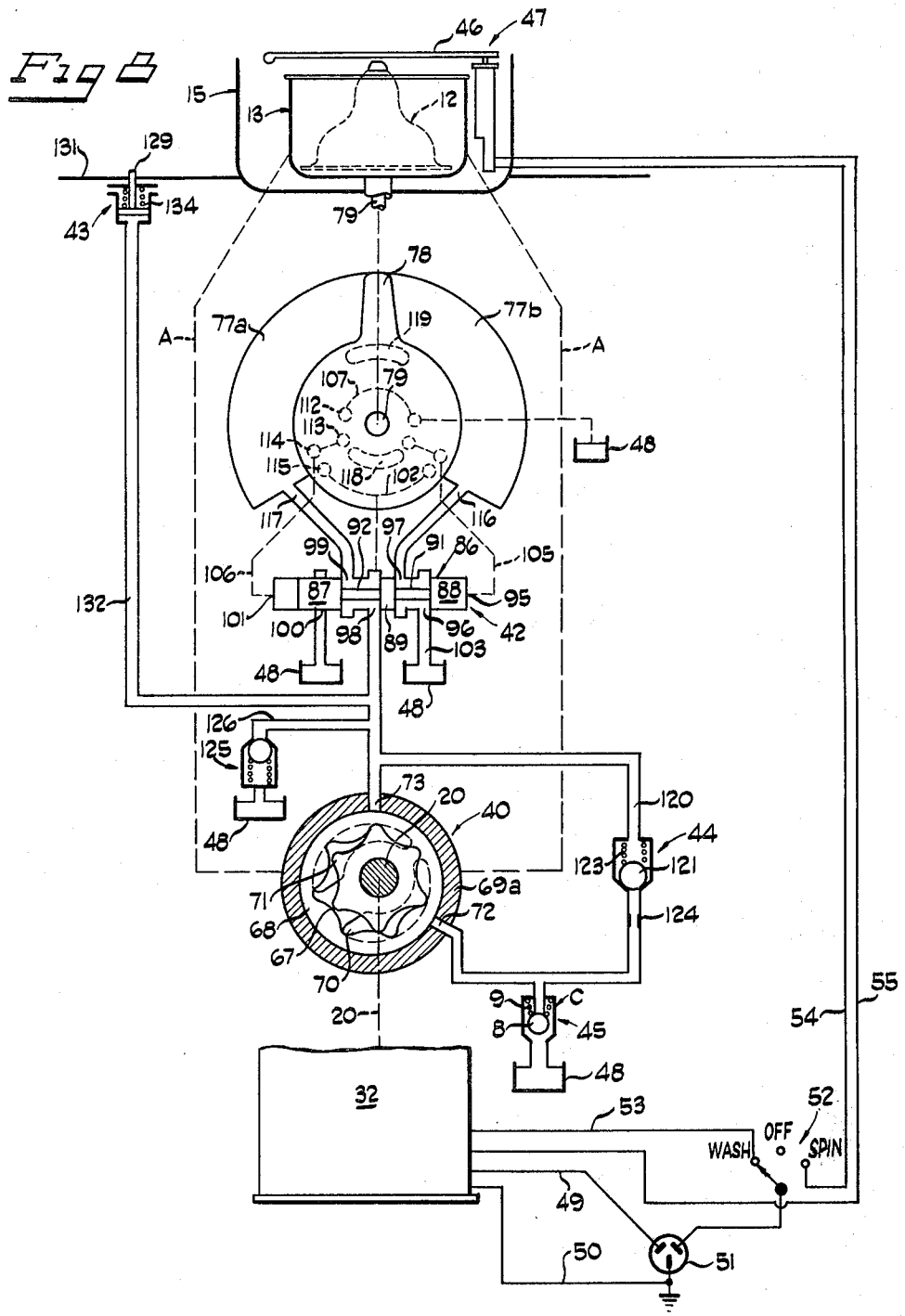

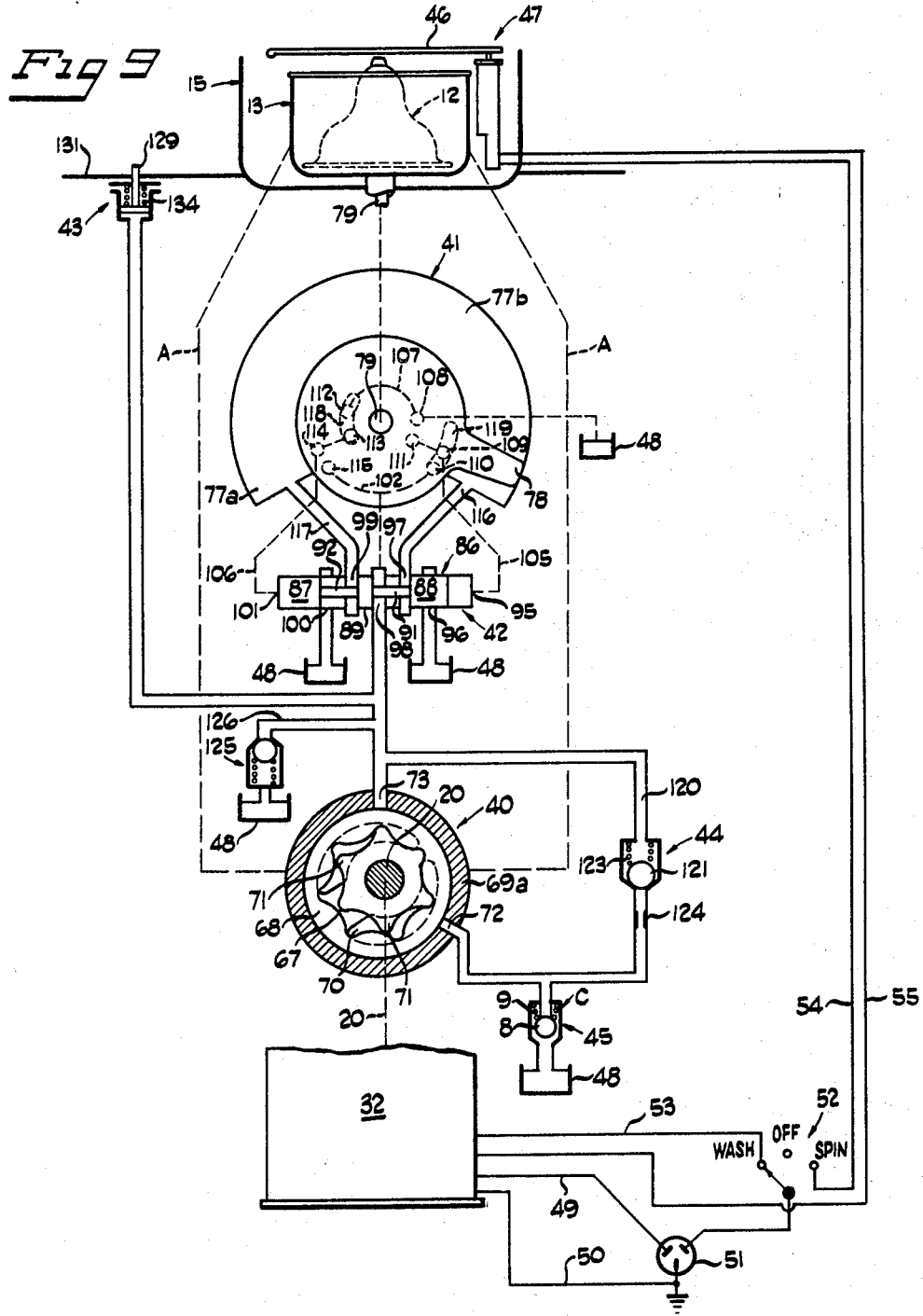

June 18, 1968  C. E. KURTZ  3,388,569
HYDRAULIC TRANSMISSION FOR FABRIC-TREATING MACHINE
Original Filed May 9, 1966  14 Sheets-Sheet 7
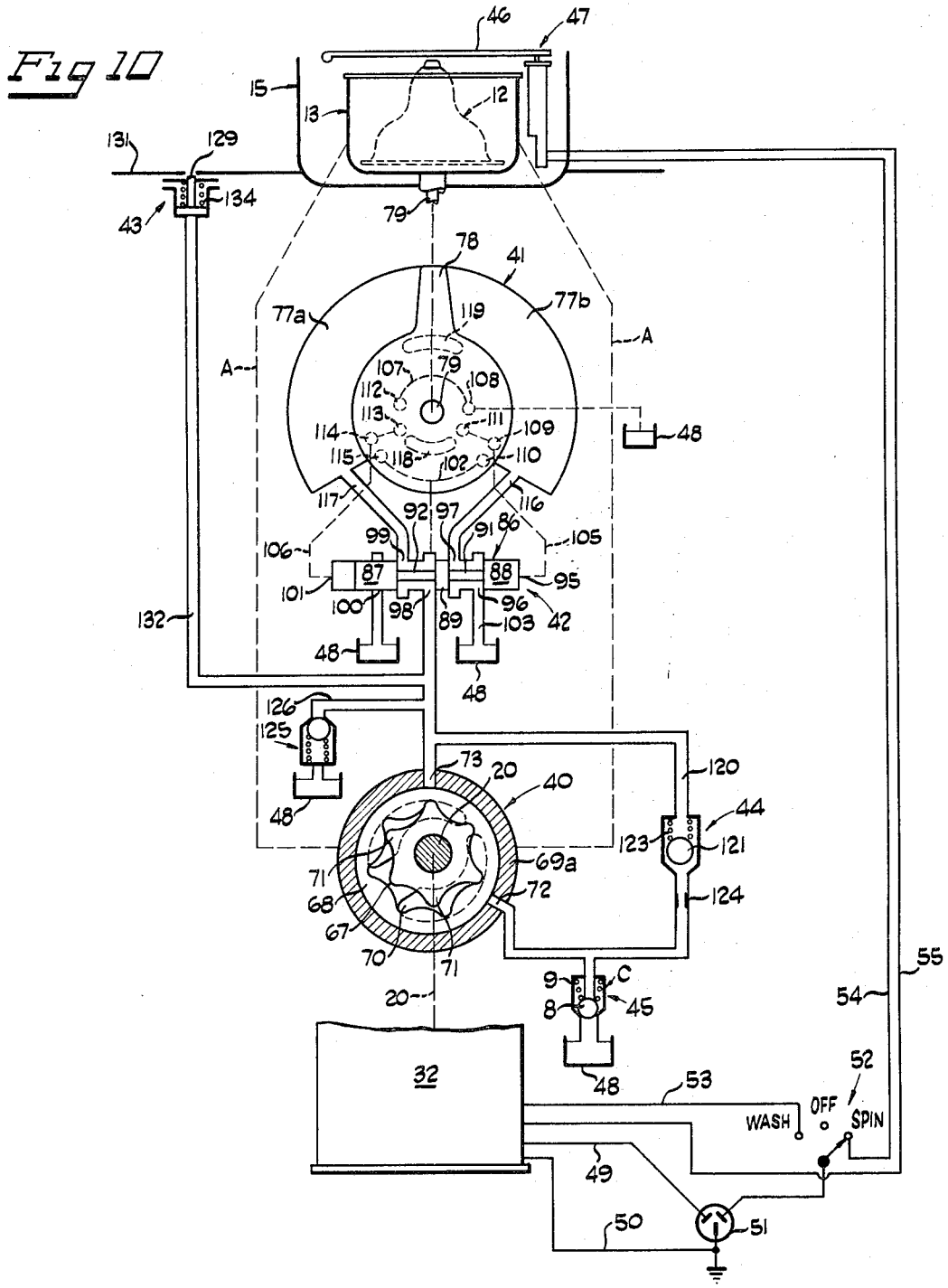

June 18, 1968  C. E. KURTZ  3,388,569
HYDRAULIC TRANSMISSION FOR FABRIC-TREATING MACHINE
Original Filed May 9, 1966  14 Sheets-Sheet 8
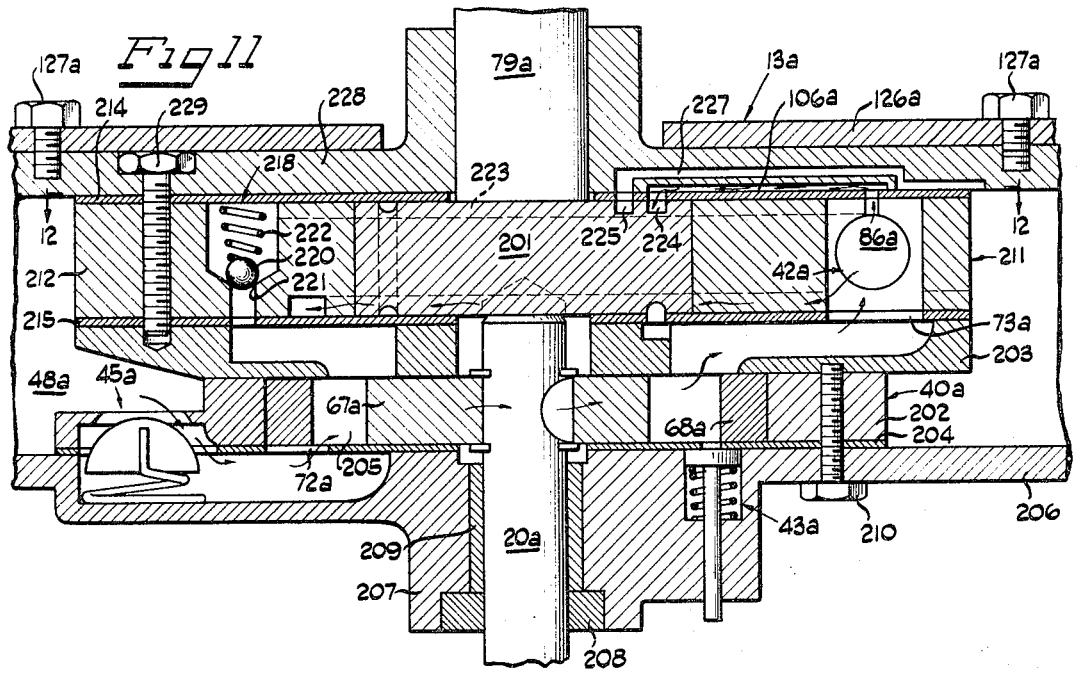
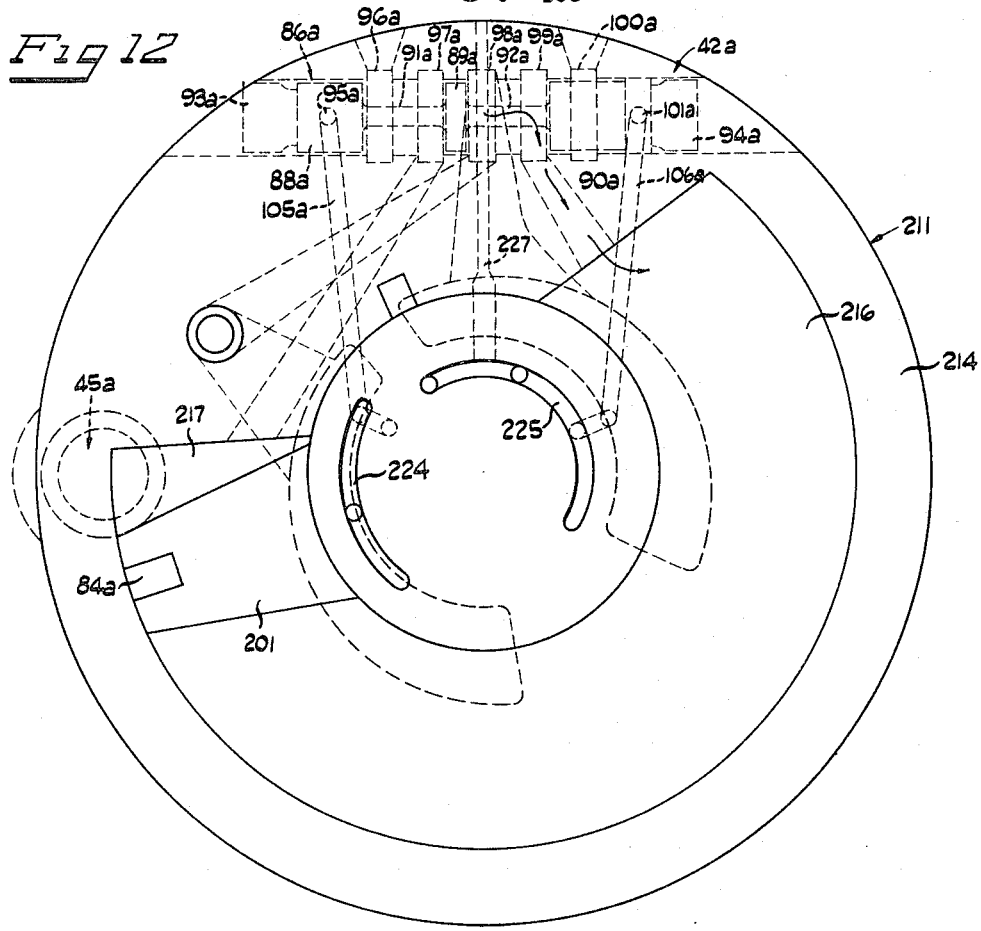

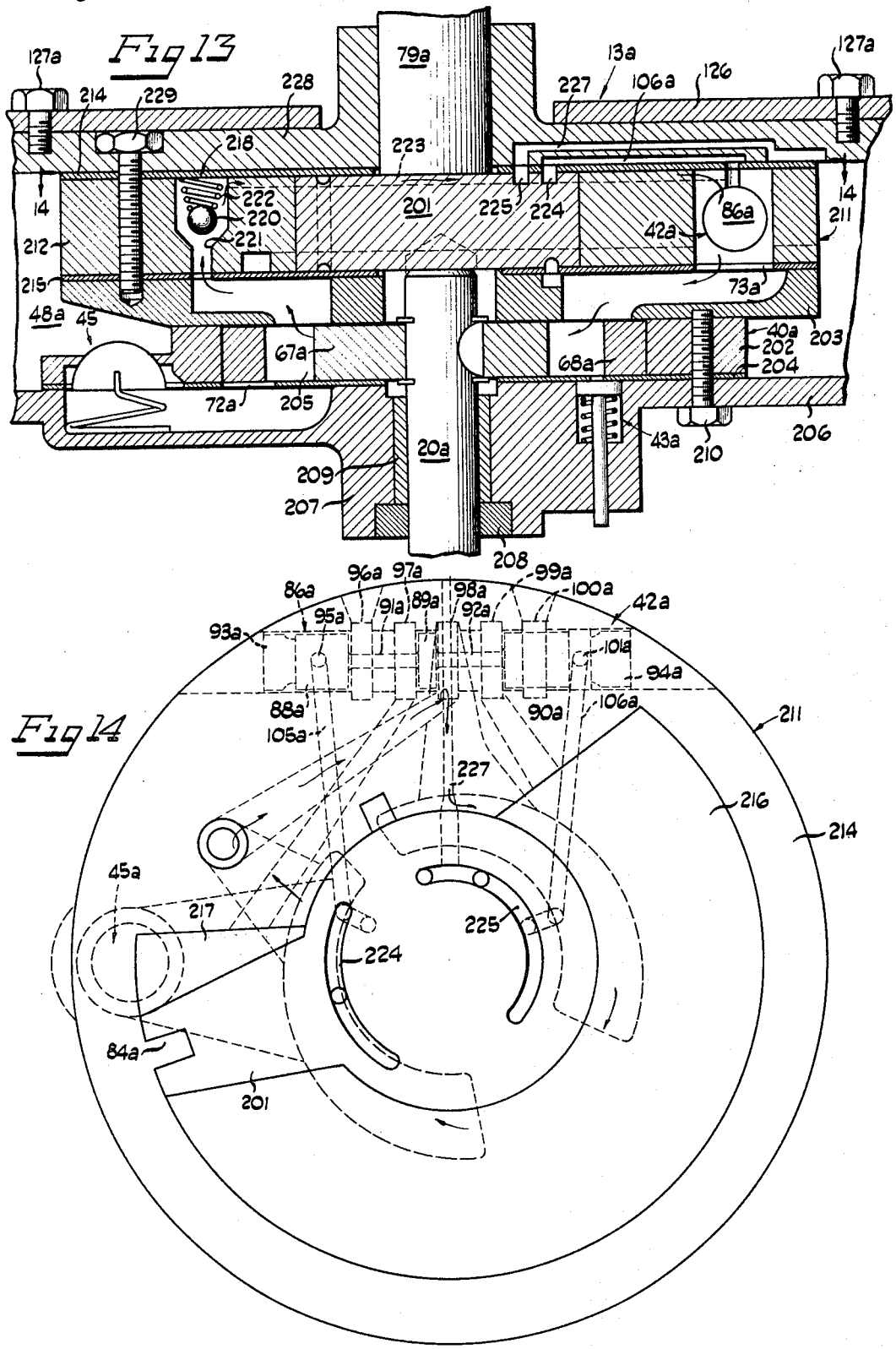

June 18, 1968        C. E. KURTZ        3,388,569
HYDRAULIC TRANSMISSION FOR FABRIC-TREATING MACHINE
Original Filed May 9, 1966        14 Sheets-Sheet 10
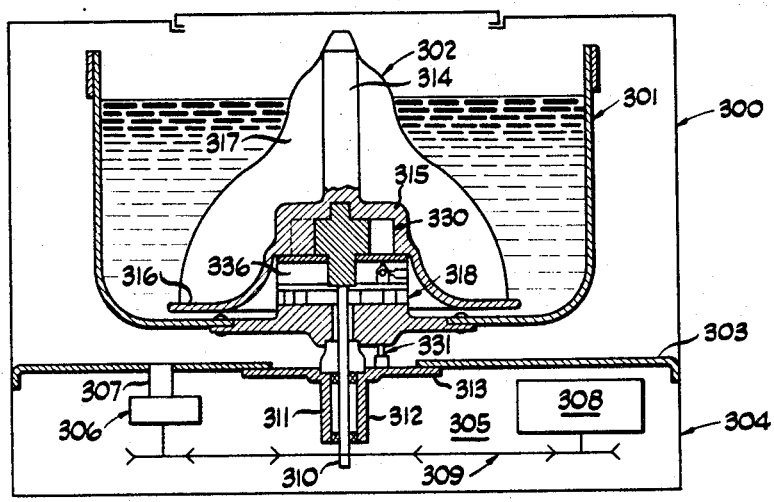
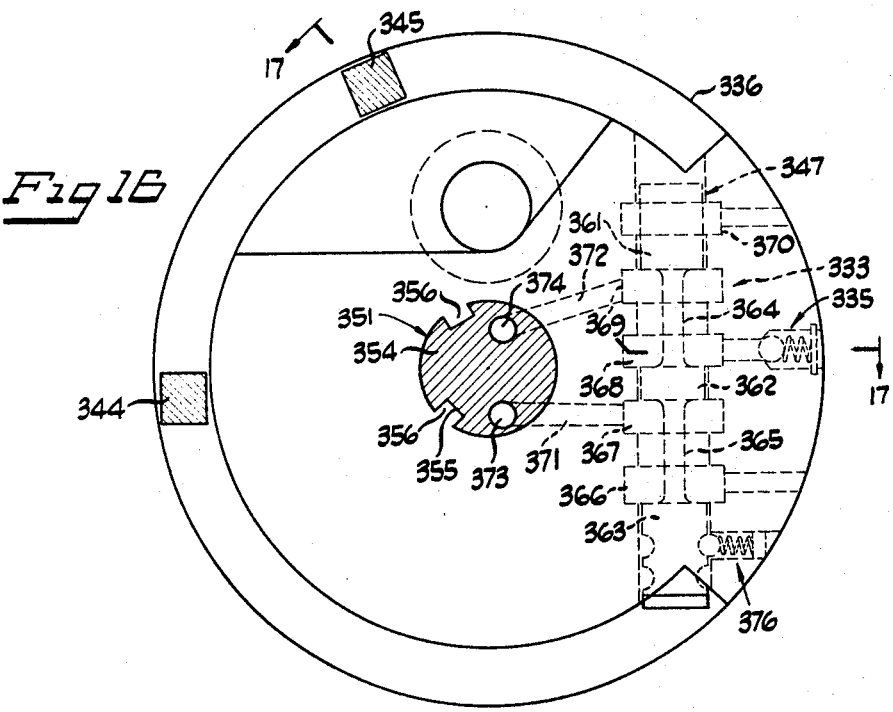

June 18, 1968 C. E. KURTZ 3,388,569
HYDRAULIC TRANSMISSION FOR FABRIC-TREATING MACHINE
Original Filed May 9, 1966 14 Sheets-Sheet 11
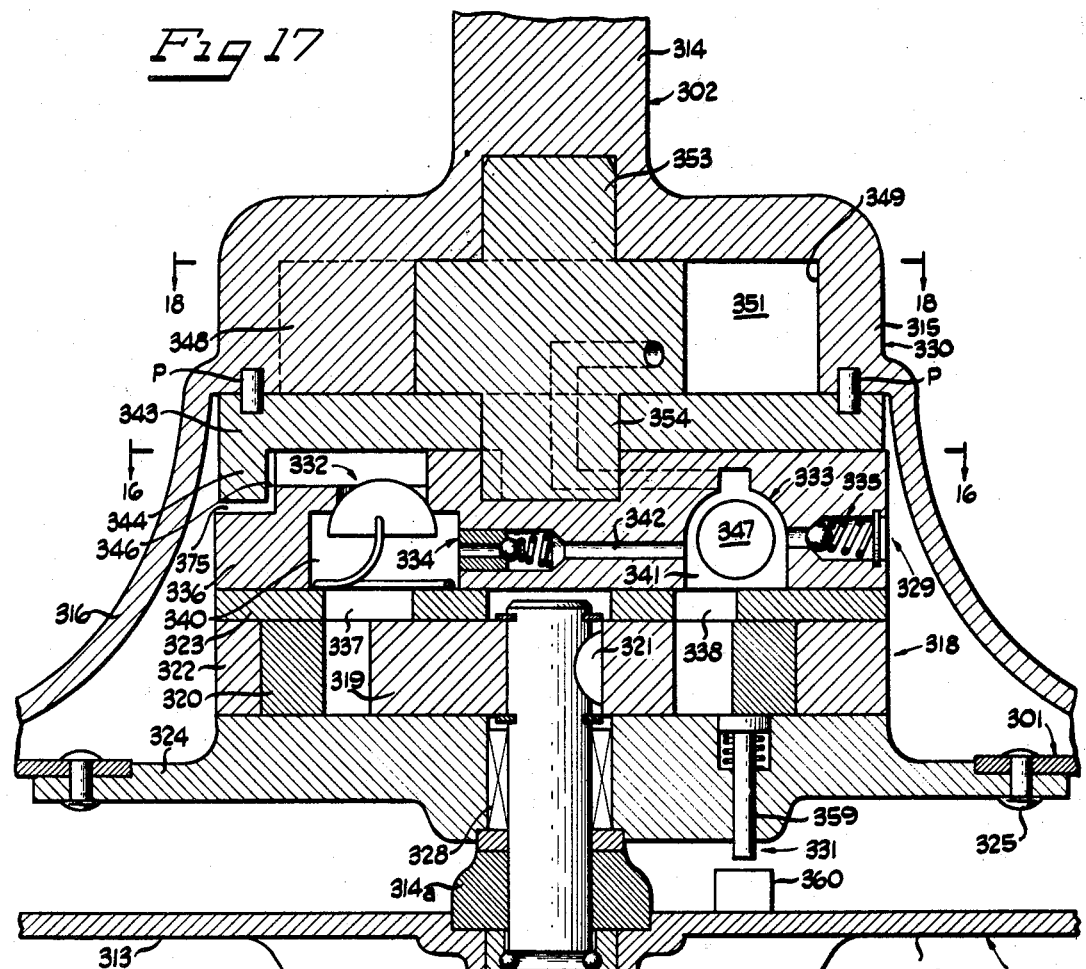
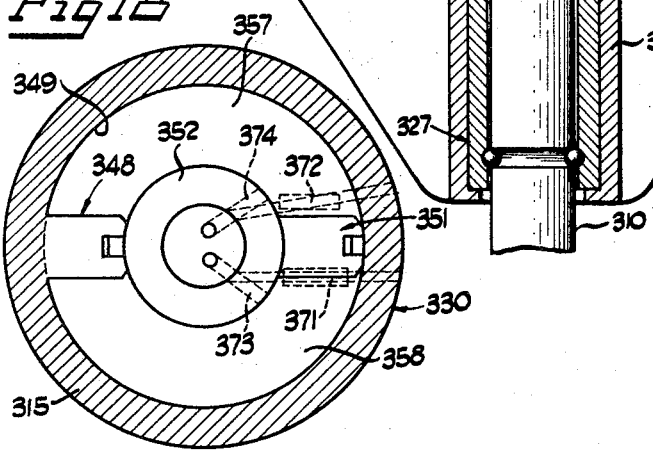

June 18, 1968    C. E. KURTZ    3,388,569
HYDRAULIC TRANSMISSION FOR FABRIC-TREATING MACHINE
Original Filed May 9, 1966    14 Sheets-Sheet 12

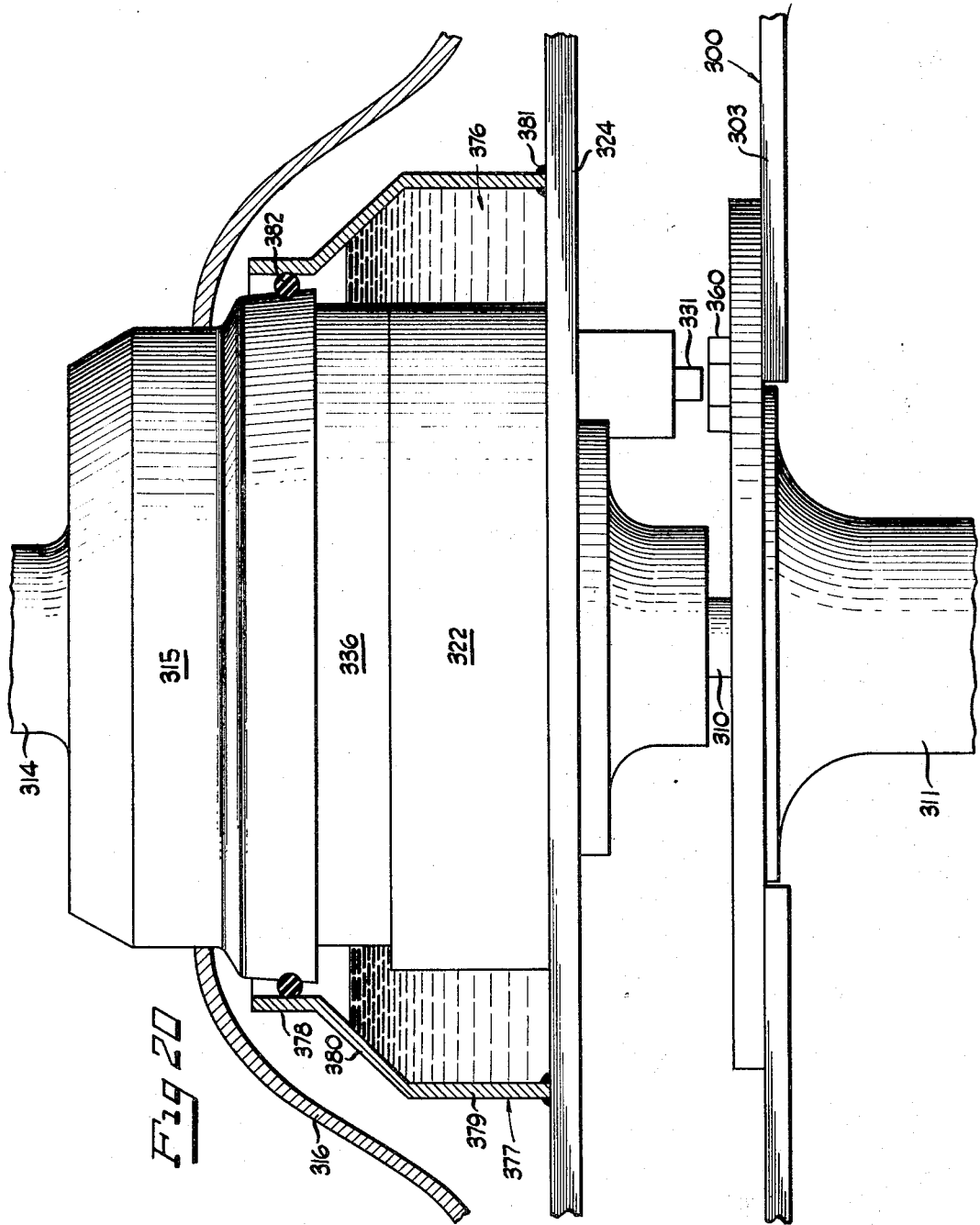

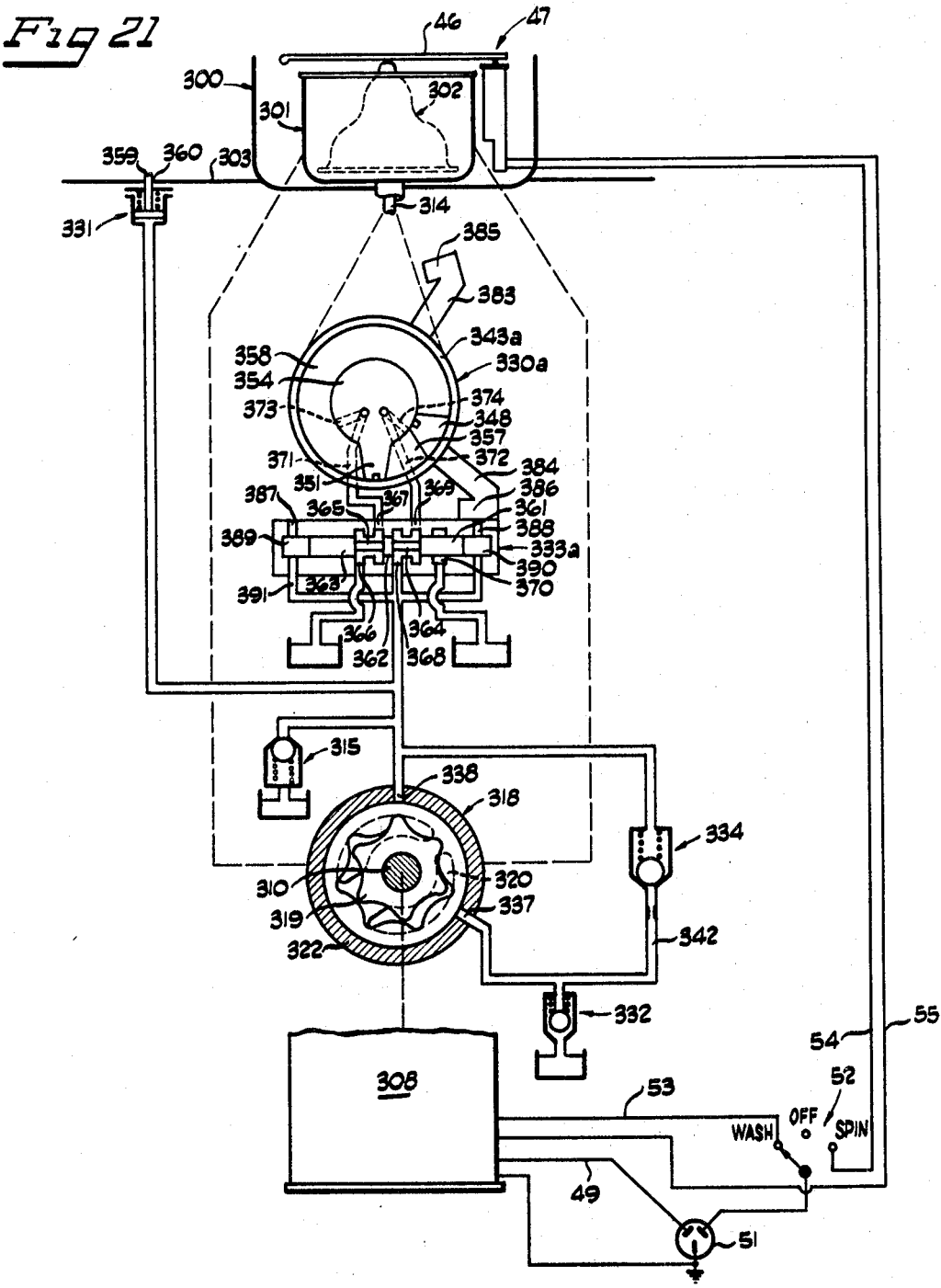

United States Patent Office 3,388,569
Patented June 18, 1968

3,388,569
HYDRAULIC TRANSMISSION FOR FABRIC-
TREATING MACHINE
Curtis E. Kurtz, Arlington Heights, Ill., assignor to Borg-Warner Corporation, Chicago, Ill., a corporation of Illinois
Continuation of application Ser. No. 548,787, May 9, 1966. This application Aug. 8, 1967, Ser. No. 661,760
44 Claims. (Cl. 68—23)

ABSTRACT OF THE DISCLOSURE

A fabric-treating machine having a tub, a rotatable fabric container in the tub, and an agitator in the container, and a hydraulic transmission for oscillating the agitator for a washing operation and for rotating the container for an extract-spin operation, the transmission having a pump assembly including a pumping member, and a housing therefor and connected to the container, the housing being held stationary when the pumping member is rotated in one direction to provide fluid under pressure to effect agitator oscillation, subsequent release of the pump housing when the pumping member is rotated in a reverse direction, hydraulically coupling the pumping member and housing to rotate the pump assembly and thereby the container.

This application is a continuation of application Ser. No. 548,787, now abandoned, filed May 9, 1966, and assigned to the assignee of the present application.

This invention relates to hydraulic transmissions and more particularly the hydraulic transmissions for fabric-treating machines, such as clothes washers having a vertically disposed agitator oscillatable to wash the clothes and located in a clothes container rotatable to extract liquid from the clothes.

Prior hydraulic transmissions for clothes washers employed a pump having a stationary housing and an actuatable pumping member for providing fluid under pressure, the pumping member being driven in opposite directions of rotation by a reversible electric motor. In one direction of rotation of the pump, fluid is directed from the pump to a hydraulically operated vane motor coupled to the agitator to perform a clothes-washing operation. Control of the vane motor is provided by valving, such as a spool valve, operable to direct fluid under pressure alternately to opposite sides of the vane motor to oscillate the vane and thereby the agitator. Operation of the valving is controlled by the oscillating movement of the motor vane which actuates the spool valve to shift the valve to provide fluid under pressure successively to opposite sides of the vane. These hydraulic transmissions also include a second and separate hydraulic motor operable, upon rotation of the electric motor, to rotate the clothes container to extract liquid from the clothes.

The present invention is directed to simplifying such prior art hydraulic transmissions by utilizing the pump as a hydraulic coupling drivingly connectible to and rotating the clothes container during the extract-spin operation of the clothes washer, thus eliminating, in its entirety, a separate hydraulic motor and its function, previously believed to be essential to provide an operative transmission for clothes washers.

An object of the invention is to provide an improved hydraulic transmission of the type described and in which the pump has its housing connected to the clothes container and held stationary during rotation of the pumping member in one direction to provide fluid under pressure to effect oscillation of the agitator, for the washing operation, and in which the pump housing is released for rotation and hydraulically coupled to the pumping member, during its rotation in the reverse direction, to rotate the container for the extract-spin operation.

Another object of the invention is to provide improved hydraulic transmissions for fabric-treating machines, such as clothes washers in which the pump housing of the transmission is connected to the fabric container and is hydraulically locked to the rotatable pumping member to provide a reaction torque on the housing effective to rotate the pump assembly and thereby the container.

Another object of the invention is to provide hydraulic transmissions for clothes washers featuring a pump having its housing connected to the clothes container held stationary by a hydraulically operated device during operation of the rotatable pump member by a reversible motor, and valving, controlling pressure fluid from the pump member to a hydraulic motor to oscillate the agitator during one direction of rotation of the reversible motor, and the hydraulic device being released and the pump member being automatically hydraulically coupled to the housing element to effect rotation of the clothes container during reverse rotation of the motor.

A specific object of the invention is to provide a hydraulic drive arrangement for a clothes washer having a clothes container and oscillatable agitator in the container, the container being held stationary by a hydraulically operated device, and the drive arrangement including a pump having a pumping member and a housing therefor with the housing being connected to the basket, a reversible electric motor having a drive shaft connected to the pumping member, a hydraulic motor connected to the agitator, valve means controlled by the agitator and controlling operation of the hydraulic motor to oscillate the agitator when the electric motor is operated in a first direction of rotation, and other valving for controlling and restricting the flow of the fluid in a closed circuit through the pump, when the electric motor is operated in the opposite direction, to provide a reaction torque in the pump effective to induce rotation of the container by the pump housing, while the hydraulic-operated device releases the container.

Further objects and other advantages of the invention will be more clearly apparent from the following specification taken in connection with the drawings in which:

FIG. 2 is a vertical sectional view of the transmission and showing a pump, vane motor and valving of the transmission, said section being taken on line 2—2 of FIG. 3;

Figure 1:
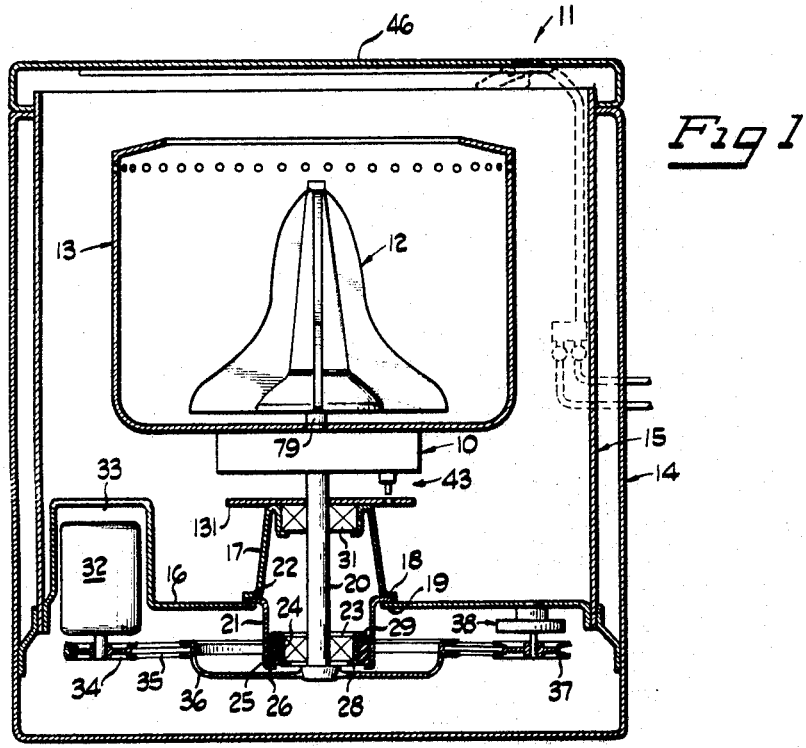
FIG. 1 illustrates a clothes washer embodying a preferred form of the hydraulic transmission of the present invention.
Figure 3:
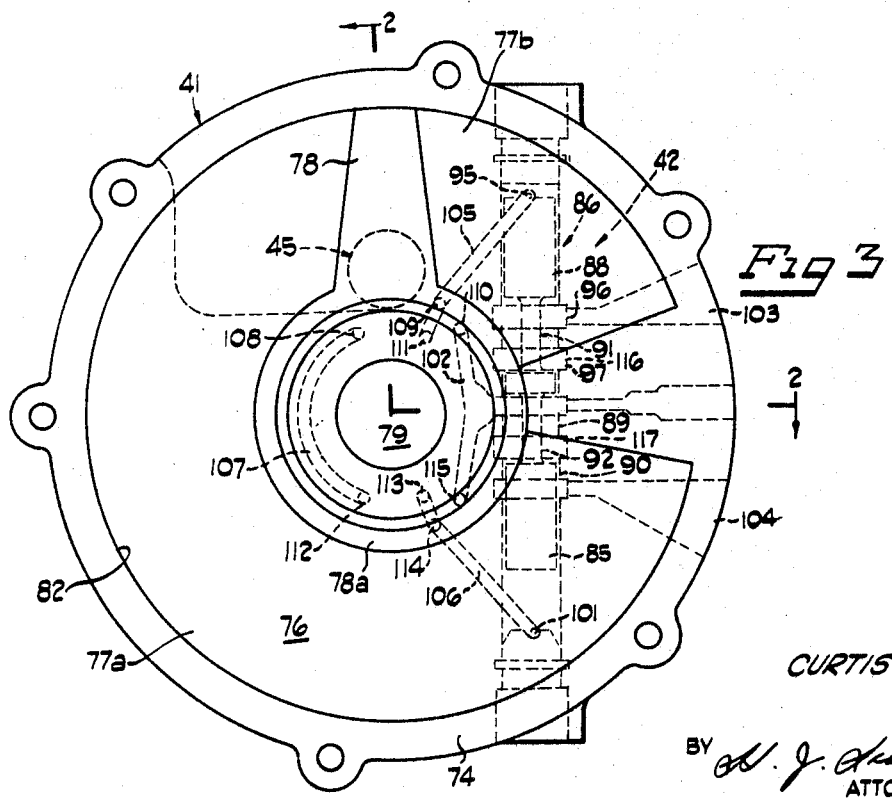
FIG. 3 is a horizontal view of the vane motor and portions of the valving of the transmission, taken on line 3—3 of FIG. 2.
Figure 4:
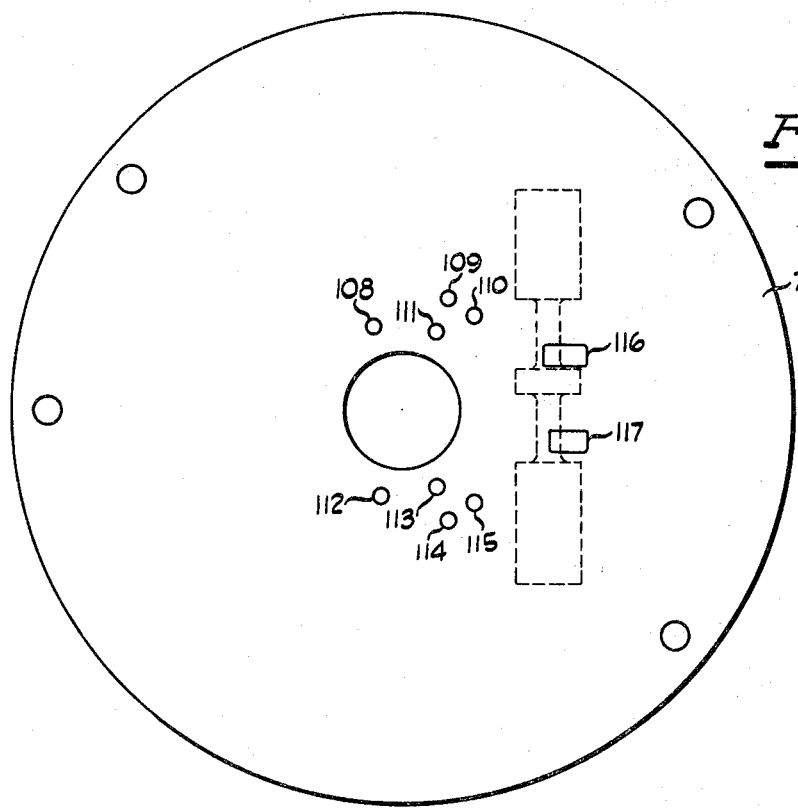
Figure 5:
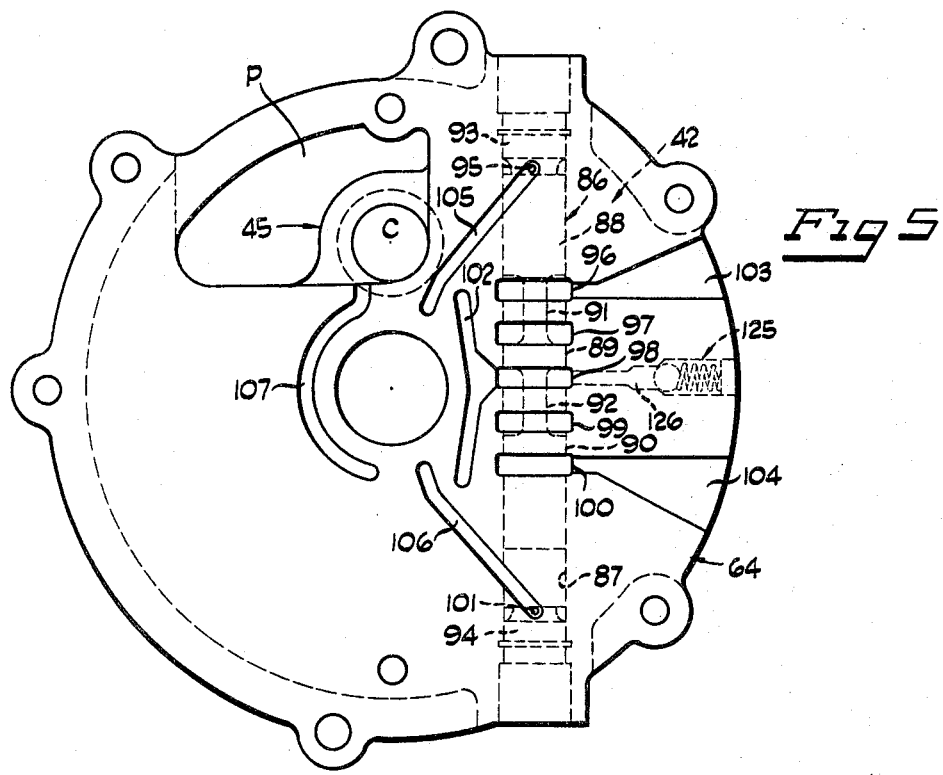

FIGS. 4 and 5 further illustrate the valving including plates having fluid ports and passages for the valving disclosed in FIGS. 1, 2 and 3;

FIG. 6 is a bottom view of the vane of the vane motor shown in FIGS. 1, 2, and 3;

FIGS. 7, 8 and 9 are schematic views illustrating a preferred embodiment of the improved hydraulic transmission for a clothes washer, respective views illustrating various positions of the hydraulic components during wash-agitate operation of the washer.

FIG. 10 is a further schematic view of the hydraulic transmission illustrating the positions of the hydraulic components during the spin-extract operation of the washer.

Figure 19:
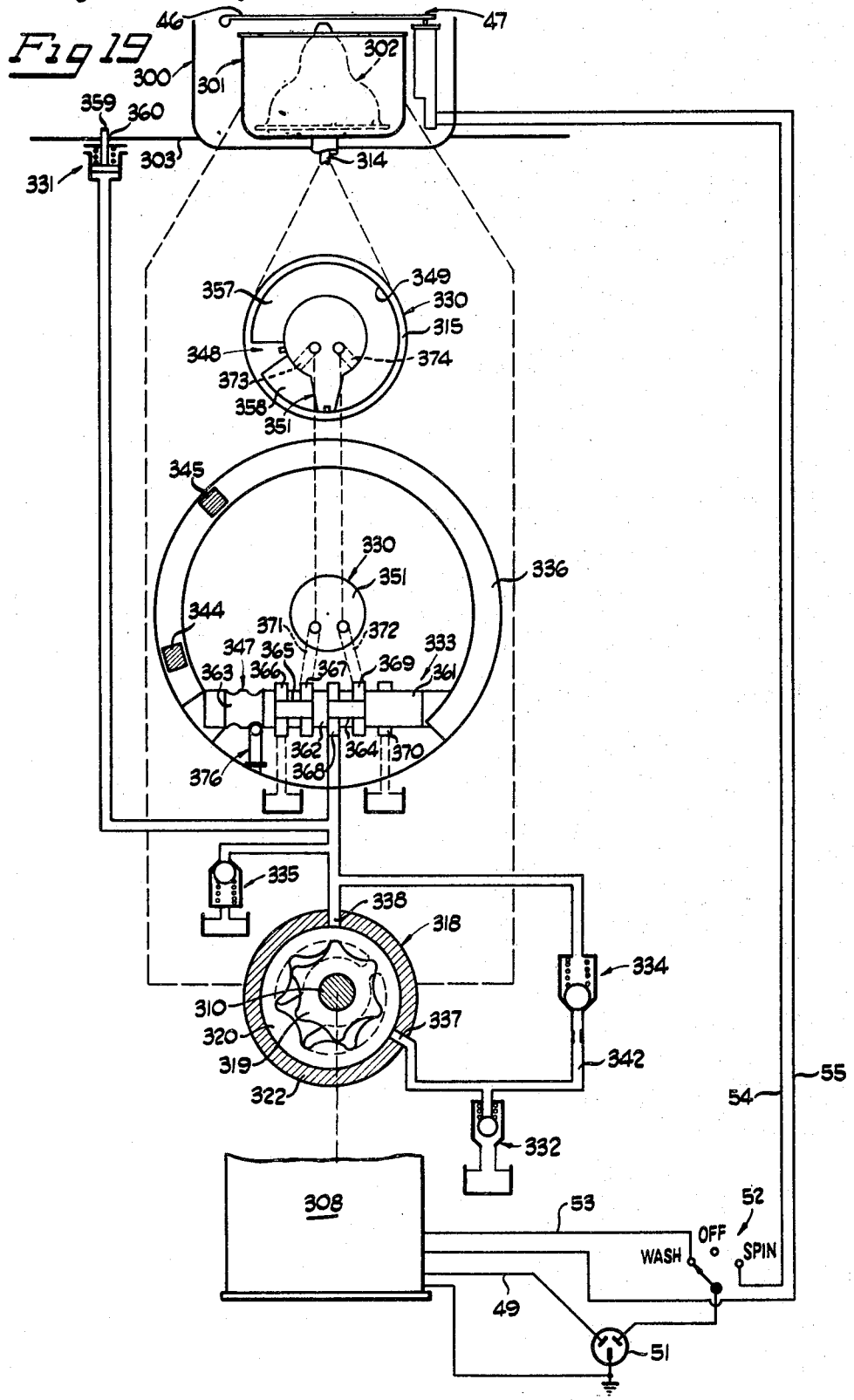

FIGS. 11, 12, 13, and 14 illustrate a modification of the hydraulic transmission in which the vane motor housing contains valving to provide a composite unitary assembly, FIG. 11 illustrating a cross sectional view of the transmission and FIG. 12 a horizontal sectional view taken on line 12—12 of FIG. 11 with the positions of the valving and fluid flow in the transmission during the wash-agitate operation, and FIGS. 13, and 14 illustrating the position of the valving and fluid flow in the transmission during the spin-extract operation;

FIG. 15 is a vertical sectional view of an automatic washer having an hydraulic transmission embodying another modification of the invention;

FIG. 16 is a horizontal sectional view of the transmission shown in FIG. 15, said section being taken on line 16—16 of FIG. 17;

FIG. 17 is a vertical cross-sectional view of the transmission shown in FIGS. 15 and 16, said section being taken on line 17—17 of FIG. 16;

FIG. 18 is a horizontal sectional view, said section being taken on line 18—18 of FIG. 17;

FIG. 19 is a schematic view illustrating the hydraulic transmission shown in FIGS. 15–18;

FIG. 20 is a vertical sectional view illustrating a modification of the hydraulic transmission shown in FIGS. 15 to 19, inclusive; and FIG. 21 is a schematic view illustrating another embodiment of the transmission for washing machines.

Referring to FIG. 1, a preferred embodiment of my improved hydraulic transmission 10 is shown in a clothes-cleaning machine or washer 11 having an oscillatable agitator 12 to wash the clothes and a clothes container or basket 13 rotatable to extract washing liquid from the clothes.

The washer comprises a cabinet or casing 14 supporting a water container or tub 15 enclosed at its bottom end by a bulkhead 16 and a flexible rubber inverted cup-shaped member 17 overlying a central opening in the bulkhead and having an annular flange 18 connected to the opening-defining peripheral edge 19 of the bulkhead and in water-sealing thereto.

The basket 13, agitator 12, transmission 10, and the transmission drive shaft 20, are supported on a cylindrical steel mounting member 21 having its upper peripheral edge defined by a flange 22 extending between and connected to the flange 18 of member 17 and bulkhead edge 19. More particularly, the drive shaft 20 extends through the members 21 and 17 and is rotatably mounted on the member 21 by a ball-bearing assembly 23. The bearing assembly 23 provides a radial and thrust bearing and, for this purpose, there is disposed between and engaging the outer race 24 of the assembly 23 and the inner cylindrical surface of the member 21, an annular resilient bushing 25 of rubber or the like. The bushing 25 is mounted on a radially inwardly directed annular peripheral flange 26 of the member 21. The outer race 24 is substantially Z-shaped in cross section with its lower inwardly extending annular flange 28 thereof engaging the bottom of the bushing and the top flange 29 overlying the top of the bushing. It will be apparent that the described mounting arrangement provides for the basket, agitator, transmission and its drive shaft, being flexibly and solely supported at a point near the lower end of the drive shaft. Disposed within the upper opening of the flexible member 17 and surrounding the drive shaft 20 is a roller-bearing assembly 31, the member 17 having a cylindrical flange engaging the outer race of the assembly 31, the inner race of the assembly being secured to the drive shaft. The flexible member 17 is effective to vertically align the bearing assemblies 23 and 31 and resistively permits gyratory movement of the basket, agitator and the transmission, about the lower end of the drive shaft due to an unbalanced load during rotation of the basket.

The drive shaft is connected to a reversible electric motor 32 pivotally supported on the cabinet and extending upwardly into a pocket 33 formed in the bulkhead 16. The motor 32 has a drive pulley 34 connected by a belt 35 to a pulley 36, secured to the end of the drive shaft 20 and to a pulley 37 connected to a water pump 38 provided for exhausting water from the tub through an opening in the bulkhead 16 during rotation of the basket.

Referring to the improved hydraulic transmission, and specifically to FIGS. 1–10, inclusive, illustrating a preferred embodiment of the invention, the important elements of the hydraulic transmission are a reversible fluid pump 40 having its housing connected to the basket; the vane-type hydraulic motor 41 for driving the agitator; control valving 42 (FIG. 3) for the motor 41; a lock mechanism 43 for the basket 13; and spin-control valves 44 and 45.

The lid 46, illustrated in FIGS. 1, 7–10, for the clothes basket of the washer includes a safety switch mechanism 47 operable to interrupt a power supply to the motor 32 when the lid 46 is raised.

A fluid sump 48 is provided which is schematically illustrated for convenience in various places in the schematic views of FIGS. 7–10, although in actual construction one fluid sump 48 is provided into which all of the exhaust connections for various elements of the transmission exhaust pressure. In FIGS. 7–10, electric conductors 49 and 50 interconnect a source of power 51 with motor 32, the conductor 50 being a ground conductor. The cycle selector switch 52 is connected to the motor by a conductor 53. The switch 52 is schematically illustrated in a simplified form although in the washer installation the cycle selection would be performed by a sequential controller or timer well known in the art. A conductor 54 connects safety switch 47 to the switch 52. The conductor 55 connects safety switch 47 to the motor 32.

Referring now more particularly to the transmission components, FIGS. 1–6 illustrate the structural components and their assembly in the transmission, while FIGS. 7–10 schematically identify the components in their operative relation to each other and to the agitator and basket and the drive motor and with particular reference to the fluid passages interconnecting the components in the performance of their functions in controlling oscillating movement of the agitator and rotation of the basket.

In general, and as shown in FIGS. 1–6, the transmission structure comprises a unitary assembly adapted to be drivingly connected to the agitator 12 and to the basket 13 at its upper end and to the drive shaft 20 at its lower end. More particularly, and as shown in FIG. 2, the transmission structure comprises a housing 56 provided by top and bottom annular plate 57 and 58, and a cylindrical collar 59 extending between the plates and having their top and bottom edges received within circular grooves 60, 61 respectively formed in the plates to provide the sump or reservoir 48 for the hydraulic fluid. Seals 62 and 63 are positioned in the grooves and engage the collar to contain the fluid in the sump 48. The housing 56 contains, and its top and bottom plates 57 and 58 confine, the operating components of the transmission including the vane motor 41; the valve block 64 containing the control valving 42, 44 and 45; hydraulic lock mechanism 43; and the pump 40. A plurality of bolts 65 extend through and connect the plates 57 and 58, the vaned motor housing, and valve block 64 to confine the vane motor 41, the valve assembly and pump 40 therebetween. A plurality of pins 65a are provided to connect the valve block 64, and top and bottom pump plates 69b, and 69c and ring 69a, to the transmission housing plate 58, each pin 65a extending through aligned openings in these members to prevent relative movement thereof.

The pump 40 is a conventional positive displacement pump of the gerotor type having (FIGS. 2 and 7) an inner rotor 67 keyed to the drive shaft 20, and an outer rotor 68 rotatable in a housing. The housing comprises a cylindrical ring 69a surrounding the rotors, and top and bottom plate 69b and 69c. The outer rotor 68 is provided with recesses 70 therein adapted to receive the teeth 71 on the inner rotor 67. As seen in FIG. 7, rotation of the rotor in a clockwise direction, during the agitate cycle, causes fluid to enter the pump through the port 72 (FIGS. 2 and 7) in the housing plate 69b and, in a well-known manner, will act in the fluid chambers between the teeth 71 of the inner rotor and the recesses 70 of the outer rotor to provide fluid under pressure to a port 73 in the housing plate 69b. Upon rotation of the rotors in a counterclockwise direction (FIG. 10), the rotors are effective to cause fluid to enter the pump through port 73 and to provide fluid under pressure to port 72.

The vane-type hydraulic motor 41 is shown structurally in FIGS. 2, 3, and 6 and schematically in FIGS. 7–10 and comprises a body 74, defining with top and bottom fluid-passage plate 75 and 76, a fluid chamber in which is received the vane 78 connected to the agitator shaft 79. The body 74 has a wall 80 of frusto-conical shape projecting radially inwardly into the chamber and dividing the chamber into two portions 77a and 77b. The wall 80 has its apex formed arcuately concave to engage the cylindrical side portion of the vane 78 to provide, with the vane, the expansible and contractible fluid chambers 77a and 77b. The vane 78 reciprocates as fluid under pressure is admitted alternately to opposite sides thereof into the chamber portions 77a and 77b to oscillate the agitator during the washing cycle. As seen in FIG. 2, the vane is formed integral with the agitator shaft 79 journalled in the top cover plate 57, the portion of the shaft 79 extending below the vane is journalled in a central opening 81 of the valve block 64. The vane has an arcuate tip conforming to the cylindrical interior surface 82 of the body 74 and, as shown in FIG. 6, the tip is provided with a recess receiving a spring 83 and plunger 84, the spring actuating the plunger into engagement with the surface 82 to preclude fluid flow between the chamber portions 77a and 77b. It may be noted that the top cover plate 57, plates 75 and 76, and vane 78, contain various fluid ports and passages cooperating with ports and passages in the valve block 64, positioned between the vane motor and the pump, in a manner later to be described.

The valve block 64, as shown in FIG. 5, contains control valving 42 including a spool 86 reciprocable in a tangential bore 87 in the valve block under the influence of fluid pressure controlled by the vane 78 to direct fluid under pressure into one of the chamber portions 77a or 77b while simultaneously exhausting the fluid in the other chamber portion, to reciprocate the vane. More particularly, and referring to FIGS. 2 and 7, the spool 86 is provided with lands 88, 89, and 90, the lands 88 and 89 being separated by a groove 91 and the lands 89 and 90 being separated by a groove 92. The ends of the bore are provided with plugs 93 and 94. The spool is shiftable in the bore 87 by fluid under pressure supplied successively to opposite ends of the spool.

Referring to FIGS. 2, 5, and 7, the area of the valve body around the valve 86 includes ports 95, 96, 97, 98, 99, 100, and 101. Fluid conduit 102 is connected to port 98. Conduits 103 and 104 are connected to ports 96 and 100, respectively, and are exhaust ports connected to the sump 48. Conduits 105 and 106 are connected to ports 95 and 101, respectively. The valve block is also provided with an arcuate groove 107 communicating with a pocket P in the block leading to the sump 48. The pocket (FIGS. 2 and 5) contain the valve 45 comprising an arcuate portion of the block engaging the plate 69b and defining a chamber C having an upper opening closed by a hemispherical button-like valve member 8 actuated by a spring 9. The chamber C is connected to port 72 of the pump 40. As seen in FIGS. 2 and 6, the bottom of the hub 78a of the vane 78 is provided with two radially spaced arcuate grooves 118 and 119 adapted to be connected to conduits 102, 105, 106, and 107. As seen in FIG. 2, the plate 76 is positioned between and its top side contacts the vane and housing of the vane motor and its bottom side contacts the top of the valve block 64. To afford fluid communication between the valve block and vane motor fluid chambers, the plate 76, as seen in FIGS. 3 and 4, is provided with circular openings 108, 109, 110, 111, 112, 113, 114, 115 and rectangular openings 116 and 117. The openings 108 and 112 are located at opposite ends of the arcuate passage 107 in the valve block and are connectible to the arcuate groove 118 in the vane hub 78a (FIGS. 3, 6, and 7). The openings 110 and 115 are located respectively at opposite ends of the arcuate channel 102 in the valve block and are connectible to the arcuate groove 119 in the vane hub 78a (FIGS. 3, 6, and 7). The openings 111 and 113 are located respectively at the radially inner ends of the passages 105 and 106 of the valve block and are connectible to the arcuate groove 118 in the vane hub 78a. The openings 109 and 114 are located respectively above the passages 105 and 106 of the valve block and are connectible to the arcuate groove 119 in the vane hub 78a. The openings 116 and 117 in the plate 76 are located to connect these openings with the ports 97 and 99, respectively, in the valve block 64, the opening 116 communicating with the chamber 77b and the opening 117 communicating with the chamber 77a to direct fluid under pressure to one or the other of the chambers, dependent on the position of the spool 86.

During rotation of the vane, the passage 107 in the valve block functions to exhaust fluid from one end of the valve spool via one of the passages 105 or 106 while fluid under pressure is admitted by the other passage 105 or 106 to the other end of the spool to shift the spool and thereby cause fluid under pressure to flow through opening 116 or 117 to one side of the vane while exhausting fluid through the other opening from the other side of the vane. In this manner, the vane motor controls the operation of the spool to direct fluid to, and exhaust fluid from, the motor chambers 77a and 77b to oscillate the vane.

Referring to FIGS. 2 and 7, the valve block 64 is provided with a passage 120 extending between and connecting the pump port 72, via chamber C, with the port 73 of the pump. The valve 44 is located in the passage 120 and comprises a valve member 121 slidably positioned in the passage and controlling flow of fluid through the passage. The valve 121 is square in cross-section and has a beveled end 122 in complementary engagement with a portion of the block, defining the passage, to prevent flow of fluid through the passage and, for this purpose, a hairpin spring 123 is located in a recess in the block and extends into the passage to engage the valve member. Fluid under pressure, from port 73 of the pump, enters the passage 120, but is precluded from flowing through the passage by the valve 44. When fluid under pressure, from pump port 72, flows into the passage 120, the valve member 121 is shifted to the right (FIG. 2) against the action of spring 123. The member 121 is provided with a groove 124, in the top surface thereof, to restrict fluid flow to the pump port 73.

It will be apparent that, during rotation of the pump in one direction, suction of the pump causes fluid to flow from the sump 48 into the chamber P, through valve 45, into the pump port 72 and through the pump where the fluid is pressurized and flows from the port 73 into the valve 42, and also into passage 120 where the fluid is blocked by the valve 44. During rotation of the pump in a reverse direction, the valve 45 is closed and valve 44 opens and its groove 124 throttles the fluid to hydraulically couple the pump housing and rotors for a purpose to be described.

A relief valve 125 (FIGS. 5 and 7) is provided in a passage 126 extending between the sump 48 and the valve port 98 to control the pressure of the fluid from the pump to the vane motor and spool valve 86.

Referring to FIG. 2, the transmission housing top plate 57 contacts the bottom wall 126 of the basket and is secured thereto by bolts 127 extending through the basket wall and into the top plate 57 so that the transmission housing is secured to the basket. To prevent rotation of the basket and transmission during the washing-agitate operation, the transmission plate 58 is provided with the hydraulically-operated lock mechanism 43 having a plunger 129 actuable to enter one of a plurality of openings 130 in a stationary flat plate 131 secured to the top of the flexible member 17 as shown in FIGS. 1 and 2. The openings in plate 131 are circumferentially spaced about the drive shaft 20. When the plunger 129 is moved downwardly, it enters one of the openings 130 to connect the plate 131 to the transmission housing and thereby to the basket 13 to prevent rotation of the basket during the wash-agitate operation. Referring now specifically to FIG. 2, the plate 58 has aligned bores 132 and 133, the bore 132 containing a spring 134 acting against the head of the plunger 129 to raise the plunger above the openings 130 in the plate 131. The bore 132 is connected to the pump port 73 in the pump so that, upon rotation of the pump in a clockwise direction (FIG. 7) during the wash-agitate operation, fluid under pressure from port 73 is applied to the head of the plunger to move the plunger downwardly into an opening 130. Upon rotation of the pump in a counterclockwise direction during the spin-extract operation, fluid pressure is relieved on the plunger and the spring 134 raises the plunger to disconnect the basket from the plate 131.

Reference is now made to the schematic disclosure in FIGS. 7-10, inclusive, for an explanation of the operation of my improved transmission. FIGS. 7, 8, and 9 illustrate the transmission in its relation to the agitator, basket, drive motor, and electrical controls, during the various stages of the washing-agitate operation, while FIG. 10 illustrates the relationship during the spin-extract operation. In FIGS. 7, 8, and 9, the electric motor 32 is energized and rotates the drive shaft 20 and the pump rotors 67 and 68 in a clockwise direction to provide fluid under pressure to the valve 42, and thereby to the vane motor 41; to the hydraulic lock mechanism 43 to position the plunger 129 in the stationary plate 131; and to the relief valve 125. The valve 44 is closed. Suction of the pump causes fluid to be drawn from the sump 48 through valve 45 and into the port 72 of the pump. Control of the direction of rotation of the motor is provided by positioning the movable member of switch 52 in engagement with the switch contact "WASH" to provide current flow through the motor windings in well-known manner.

Referring to FIG. 7, the spool 86 of valve 42 controls pressure fluid flowing from port 73 of the pump through port 98 of the valve to direct the fluid through groove 92 of the valve spool, port 99, opening 117 in plate 76, into the chamber portion 77a of the vane motor to effect movement of the vane 78 in a clockwise direction. Also, the vane has its groove 119 connecting passages 114 and 115 in plate 76 to passage 102 in valve block 64 connected to groove 92 of the spool 86 so that fluid under pressure from groove 92 flows through port 114 and passage 106 in the valve block to the left end of the spool 86. Also, vane 78 has had its groove 118 connect openings 108 and 111 in plate 76 to provide a fluid exhaust passage from the port 95 and passage 105 in the valve block 64, connected openings 108 and 111 in plate 76, groove 118, groove 107 to the chamber P and sump 48. The vane 78 and thereby the agitator will be driven in a clockwise direction. During this vane movement, fluid in chamber portion 77b is exhausted through opening 116 in plate 76, port 97, groove 91 of spool 86, port 96, to sump 48.

Referring to FIG. 8, the vane has now moved from the position shown in FIG. 7 to that shown in FIG. 8. At this time, pressure fluid in chamber 77a causes continued clockwise movement of the vane, while control grooves 118 and 119 are out of registry with the ports in the valve plate 76.

FIG. 9 illustrates the position of the vane at the termination of its clockwise movement and, in this position, the groove 119 is in registry with the openings 109 and 110 in the plate 76, and groove 118 connects openings 112 and 113 in plate 16. To obtain movement of the valve spool 86 from the position shown in FIG. 8 to its FIG. 9 position, pressure fluid flowing from pump pressure port 73 through groove 92 in spool 86, and port 99 and groove 102 in valve block 64, is directed through opening 110, groove 119 in the vane, to opening 109 and groove 105 into port 95 to cause movement of the spool from its FIG. 8 position to its FIG. 9 position. At the same time, it will be noted groove 118 of the vane connects ports 112 and 113 so that fluid is exhausted from the left end of the valve through port 101, groove 106, port 113, groove 118, port 112, passage 107, to chamber P and to the sump 48. In the FIG. 9 position, the spool connects port 98, groove 91, to port 97, and opening 116 in plate 76 to pressurize chamber 77b for effecting movement of the vane and thereby the agitator in a counterclockwise direction.

It will be apparent from the above description that the vane motor is controlled to provide oscillating movement of the vane, and thereby the agitator, during the washing operation.

FIG. 10 illustrates the operation of the transmission to effect rotation of the basket during the spin-extract cycle. In FIG. 10, movable contact member of the switch 52 is moved from its "WASH" position to its "SPIN" position to control electric circuits to the motor 32 to reverse the direction of rotation of the motor and thereby the pump rotors 67 and 68 in the counterclockwise direction shown in FIG. 10. As a result, the pump is effective to provide fluid under pressure to port 72 of its housing 69a. The spring 9, supplemented by the pressure fluid, actuates valve member 8 of valve 45 (FIG. 2) to closed position and thereby pressure fluid, in chamber C of valve 45, acts on the valve member 121 to move it in the passage 120 to permit flow of the fluid through the flow-restricting groove 124 in the valve member and passage 120 to the port 73 of the pump. As fluid pressure is relieved on the hydraulic lock 43, the spring 134 actuates the plunger 129 to disconnected the transmission from the stationary plate 131.

In FIG. 10, the fluid is trapped by the closure of valve 45, and allowed to recirculate through the valve housing and pump through the fluid-flow restricting groove 124, which restrictive action develops an orifice effect providing a reaction torque on the pump housing to rotate the housing and, through its previously described connection to the basket 13, the basket in the direction of rotation of the motor 32. As the basket, in effect, is directly connected to the electric drive motor 32, through the hydraulic coupling provided by the pump, the basket rotates at a speed effective to provide spin-extract drying of the clothes.

A modification of the transmission is shown in FIGS. 11–14, in which the agitator control and spin check control valving, and the agitator drive vane-type hydraulic motor are positioned in a single housing thereby substantially decreasing the height of the transmission shown in FIGS. 1–10, while retaining the operative functions and performance thereof. FIGS. 11 and 12 illustrate the transmission conditioned for the wash-agitate operation and FIGS. 13 and 14 for the spin-extract operation. In the description of the embodiment of the invention of FIGS. 11–14, similar structure to that of FIGS. 1–10 will bear the same reference characters with the suffix a.

Referring to FIGS. 11 and 12, the agitator drive shaft 79a is integrally connected to the vane 201 and the electric motor driven shaft 20a is keyed to the inner rotor 67a of the gerotor-type pump 40a. The rotor 67a cooperates with an outer rotor 68a to provide fluid under pressure to the control valves, vane motor, and lock 43a. The rotors 67a and 68a are disposed in an annular housing member 202 having top and bottom plates 203 and 204 providing therewith a fluid working chamber 205 for the rotors. The plate 204 is positioned on the transmission housing bottom plate 206 having a hub 207 journaling the motor driven shaft 20a, suitable seals 208 and 209 being provided to prevent fluid leakage from the transmission. The transmission housing plate 206, pump housing member 202, and plates 203 and 204 are held in assembly by a plurality of bolts 210, as shown in FIG. 11.

The control valving and vane motor assembly comprises a single unitary housing, generally indicated at 211, and includes an annular member 212 having an arcuate recess (FIG. 12) providing with the top and bottom plates 214 and 215, a fluid compartment in which the vane 201 reciprocates to oscillate the agitator shaft 79a by the admission of fluid under pressure to one of the expansible and contractable fluid chambers 216, 217 of the compartment while fluid is exhausted from the other fluid chamber. The housing member 212 also contains the valve 42a, identical to the valve 42 shown in FIGS. 1-10, and comprising a spool 86a, with the member 212 having ports indicated by the same reference numerals as in FIGS. 1-10 but with the suffix a and serving similar functions in directing and exhausting fluid during the vane motor operation. In addition, the housing member 212 also contains a valve 218 comprising a pocket in the member 212 and containing a ball 220 closing a port 221 by the action of a spring 222 seated on the plate 214 during the wash-agitate operation (FIG. 11), the ball being raised by fluid under pressure from the pump (FIG. 13), during the spin-extract operation to permit the fluid to flow through the pocket and into a restricting passage 223 provided in the top of the housing member 212 and closed by plate 214, to the then-active intake port of the pump. Thus, the valve 218 functions similarly to the valve 44 of FIGS. 1-10. A valve 45a is disposed within the transmission housing bottom plate 206 and pump housing member 202, the valve connecting the sump 48a to the pump rotors and functioning in the same manner as valve 45 as previously described.

The top surface of the vane 201 is provided with grooves 224 and 225 cooperating with ports 95a and 101a of valve 42a to shift the spool 86a to direct and exhaust pressure fluid alternately relative to the chambers 216 and 217 to actuate the vane 201. More particularly, the grooves 224 and 225 of the vane cooperate with grooves 105a and 106a, in the top transmission housing plate 228, connected to the ports 95a and 101a to effect shifting of the spool 86a to direct fluid from the pump to one of the chambers 216 or 127 while exhausting fluid from the other chamber, as indicated by the arrows in FIG. 12. As the valve spool 86a functions in the same manner as described with reference to FIGS. 1-10, it is believed its operation will be apparent without a detailed description. Similarly, rotation of the electric motor and thereby the pump rotors in a clockwise direction, as viewed in FIG. 12, during the wash-agitate operation, will provide fluid under pressure from the pump to the valve 42a to effect operation thereof under the influence of the vane, valve 45a opening to provide fluid from the sump to the pump to the spool 86a and to actuate the hydraulic lock 43a, the valve 218 being closed at this time, the fluid flow being indicated by the arrows.

As seen in FIG. 11, the valve and vane motor housing 211 and its top and bottom plates 214 and 215 are connected to the transmission housing top plate 228 and to the pump top plate 203 by a plurality of bolts 229 extending through aligned openings in them. The housing plate 228 is connected to the bottom wall of the basket 13a by bolts 127a.

As shown in FIGS. 13 and 14, when the electric motor rotates the pump rotors in a counterclockwise direction during the spin-extract period, the pump provides fluid under pressure (indicated by the arrows) to the valve 45a to prevent flow of fluid from the sump 48a, and valve 218 opens to permit fluid to flow from the pressure side of the pump, through the restricting passage 223 to the intake side of the pump with consequent throttling of the pump to an extent that the pump rotors rotation is precluded providing a torque reaction on the transmission housing to hydraulically couple the shaft 20a with the basket for rotation of the basket by the housing.

FIGS. 15-19 illustrate another embodiment of my improved transmission and differing from the previously described transmissions by the provision of a vane motor and control therefore in which the vane is stationary and the vane housing rotates to actuate the vane motor-controlling valve, during the wash-agitate operation. A further feature is the location of the transmission in the confines of the basket of the washing machine, with the wash water in the washing machine tub providing the fluid for the hydraulic operation of the transmission.

More particularly, and referring to FIGS. 15 and 19, the washing machine, portions of which are schematically shown, comprises a stationary cylindrical tub 300, a rotatable and imperforate clothes-containing basket 301 in the tub, and an agitator 302 oscillatable in the basket. The bottom wall of the tub is in the form of a bulkhead 303 connected to and separating the tub from supporting structure 304. Beneath the bulkhead 303 is a compartment 305 in which is located a drain pump 306 having an intake pipe 307 extending through and connected to the bulkhead 303, the compartment further containing a reversible electric motor 308 drivingly connected, by a belt and pulley 309 arrangement (as in FIGS. 1 and 2) to the pump 306 and as to a drive shaft 310 mounted in the cylindrical portion 311 of a support 312, the support 312 having an annular upper flange 313 connected, as by welding, to the bulkhead 303 and forming a portion of the bottom of the tub. The basket, agitator and transmission comprises an assembly mounted on a bearing assembly 327 between the shaft 310 and cylindrical portion of support 312. A water seal 314a is seated in an annular recess in the flange 313 of the support 312.

As shown in FIGS. 15 and 17, the agitator 302 has a centerpost 314 extending downwardly and merging with a cylindrical housing 315. The agitator further comprises a base plate or skirt 316, of frusto-conical shape, extending downwardly from the lower peripheral edge of the housing 315. A plurality of vanes 317 are formed integral with and extend radially outward of the centerpost 314, housing 315, and plate 316.

Referring now to the transmission structure, the transmission comprises a pump 318 of the gerotor type previously described and having inner and outer rotors 319 and 320, the inner rotor being keyed at 321 to the end of the drive shaft 310 and the outer rotor being revolvable in an annular housing 322 closed at its top and bottom by plates 323 and 324 and define a working fluid chamber of the pump. The plate 324 is located to cover a central opening of the basket and forms a portion of the bottom wall thereof, the plate being secured, by revets 325, to the inner peripheral opening-defining edge of the basket. Roller bearings 328 are positioned between the shaft 310 and plate 324, to rotatably center and align the axis of shaft 310 and the axes of the pump and agitator.

The transmission further comprises a valve assembly 329 positioned above the pump and includes valves having the structure and functioning similar to control the vane motor 330, pump 318, and hydraulic lock 331 in the manner previously described with reference to the transmissions of FIGS. 1-10 and 11-14. More particularly, valve 332 functions to control the flow of water from the tub to the pump; valve 333 controls water under pressure from the pump to the vane motor; valve 334 restricts the flow of water between the suction and pressure sides of the pump; valve 335 is a relief valve. These valves are contained in a valve block 336, positioned on the top plate 323 of the pump, the plate having spaced openings providing ports 337 and 338 of the pump respectively connected to the chamber 340, containing the valve 332, and to a passage 341 leading to the valve 333. The valve block also is provided with a passage 342, containing valve 334, connecting pump port 337 and the chamber 340 to pump port 338. The valve motor 330 has a cover plate 343 having circumferentially spaced depending lugs 344 and 345 extending into an arcuate L-shaped recess 346 at the top of the block 336, the ends of the recess (FIG. 16) terminating in the ends of the bore in which the spool 347 of the valve 333 is reciprocable. The plate 343 is connected to the transmission housing 315 by any suitable means, such as the pins P, for rotation with the housing and thereby the agitator.

Referring now to the vane motor, the motor differs from the previously described embodiments by having a movable vane 348 integral with and extending from the cylindrical inner surface 349 of the transmission housing 315 into the working fluid compartment of the vane motor, and by having a stationary vane 351 located in the chamber. As seen in FIG. 18, the vane 351 engages the cylindrical inner surface 349 of the housing 315, and the vane 348 engages the outer cylindrical surface of a hub 352 of the vane 351. More particularly, the vane 351 has upper and lower shaft portions 353, 354 extending from its hub 352, the upper shaft portion 353 being journalled in a centrally located recess in the housing 315 and the lower shaft portion 354 extending through and journalled in the plate 343 and into an opening in the valve block. The shaft portion 354 is provided, as shown in FIG. 16, with slots 355 receiving splines 356 in the valve block so that the vane 351 is prevented from rotational movement relative to the valve block. As seen in FIG. 18, the fluid working compartment of the motor is divided by the vanes 348 and 351 into two expansible and contractable fluid chambers 357 and 358.

It will be apparent from FIG. 17, and as shown in dotted lines in FIG. 19, that the agitator 302, housing 315 and vane 348, and plate 343 provide a unitary assembly rotatable relative to the valve block 336, pump 318, and basket 301, during the wash-agitate operation, the basket lock 331 being operative at this time to hydraulically position its plunger 359 in engagement with a stop lug 360 on the side of the tub 300 to prevent rotation of the basket.

Referring to FIGS. 16 and 19, the valve 333 has its spool 347 provided with spaced lands 361, 362 and 363 defining grooves 364 and 365. The lands cooperate with ports 366, 367, 368, 369, and 370 in the valve block. The port 368 connects to the port 338 of the pump. Ports 366 and 370 are connected to the sump, i.e., the tub. Ports 367 and 369 are respectively connected, by passages 371 and 372 in the valve block 336, to passages 373 and 374 in the stationary vane 351. The passages 373 and 374 terminate in openings in the vane 351 in communication with chambers 358 and 357, respectively.

Referring now to the operation of the washer and specifically the transmission, upon energization of the electric motor 308 to rotate the drive shaft 310 in a clockwise direction (FIG. 19), the pump operates to draw water from the tub through a space 375 (FIG. 17) between the plate 343 and valve block 336, to the valve 332, and into the port 337 of the pump, the pump then causing the water to flow, under pressure, into the port 338 to the port 368 in the valve block 336, groove 364 of spool 347, port 369, passage 374 in the vane 351, into the chamber 357, to force the vane 348, transmission housing 315, plate 343, and agitator 302 in a counterclockwise direction. At the same time, fluid in chamber 358 is exhausted, passing through the passage 373 in vane 351, passage 371, port 367, groove 365, to port 366 and the tub.

Upon rotation of the agitator and thereby the plate 343 to engage its lug 344 with the exposed end of the land 363 of the spool 347, the spool is moved by the lug 344 to the right (FIG. 19) to control the fluid for actuating the vane 348 and agitator 302 in a clockwise direction. More particularly, the spool will be positioned to direct fluid from the pump port 338 and port 368, through the groove 365 of the spool, port 367, passages 371 and 373 into the chamber 358 causing the vane 348 and thereby the agitator to move in a clockwise direction. Fluid in chamber 357 is exhausted by way of passages 374, 372, port 369, groove 364 of the spool, port 370, to the tub.

Rotation of the agitator in the clockwise direction terminates upon the lug 345 on control plate 344 engaging and moving the spool to the left to again re-establish previously described circuits to obtain counterclockwise rotation of the agitator. It may be noted that the spool is retained in its respective control positions by the detent mechanism 376 shown in FIGS. 16 and 19.

During this washing operation, the hydraulic lock 331 is actuated by fluid, under pressure from the pump, being directed to force the plunger 359 into engagement with the tub stop 360 to prevent rotation of the basket.

To obtain rotation of the basket for the spin-extract operation, the switch is moved to its "SPIN" position to reverse the direction of rotation of the electric motor 308 and thereby drive shaft 310 and pump 318. The pump now operates to direct water through port 337 of the pump, the chamber 340 of valve 332 (valve 332 being closed) into the restricting passage 342 opening valve 334, to the port 338 into the pump for recirculation in the described fluid circuit, fluid pressure on plunger 359 being relieved to permit its spring to move and disengage the plunger from the tub stop 360. Due to the restriction to the flow of the water under pressure by the valve 334 and consequent reaction torque on the pump, the entire transmission assembly and thereby the basket is forced to rotate to extract the water from the clothes.

FIG. 20 illustrates the transmission, shown in FIGS. 15–19, having a hydraulic fluid reservoir 376 surrounding the transmission and providing a sump, in the event conventional petroleum derivatives, suitable for such use, are desired, instead of water, as the hydraulic fluid. Like numerals in FIG. 20 indicate similar parts of the transmission shown in FIGS. 15–19. The reservoir 376 is provided by a collar or band 377 surrounding the pump and valve block and having spaced upper and lower cylindrical portions 378 and 379 of different diameters and being connected by a cone-like portion 380. The portion 379 has its bottom peripheral edge secured to the plate 324 in fluid-sealing relation by welds 381, while a suitable seal, such as an O-ring 382, is located in a circumferential groove in the transmission housing and engages the inner surface of the portion 378.

FIG. 21 illustrates a modification of the transmission shown in FIGS. 15–19 and differs therefrom by the provision of hydraulic means for shifting the spool of the agitator-vane motor control valve 333a, instead of the mechanical means shown in FIGS. 16, 17, and 19. In the description of the schematic showing of FIG. 21, where its structure is similar to that of FIGS. 15–19, such structure is identified by the same designations in FIG. 21.

As shown in FIG. 21, the control valve plate 343a is provided with radially extending arms 383, 384. This valve plate rotates with the transmission housing and agitator 302 during the wash-agitate period. The arms 383 and 384 are formed with angularly-offset valve spool control portions 385 and 386 for opening and closing ports 387 and 388 in the valve block 333a leading to chambers 389 and 390 in the block and located at opposite ends of the spool 338. The chambers 389 and 390 are connected by a passage 391, which is connected to the port 339 of the pump.

During the washing operation, rotation of the pump rotors in a clockwise direction by the electric motor causes fluid under pressure to flow through the port 338 to the port 368, groove 364 of the spool, port 369, passages 372 and 374 into the chamber 357 of the vane motor to rotate vane 348 and thereby the agitator in a counterclockwise direction. At the same time, fluid in chamber 358 of the vane motor is exhausted through passages 373 and 371, port 367, groove 365 of the spool, port 366 to the sump.

To control movement of the spool, the control portion 386 of arm 384 covers and closes port 388 in the valve block so that pressure fluid, from the pump, flows through passage 391 to the chamber 390, to move the spool to the position shown in FIG. 21. While the fluid also flows through passage 391 to the chamber 390, the fluid is ineffective to actuate the spool as the fluid is exhausted through port 387 to the sump. Upon rotary movement of the agitator in the counterclockwise direction, control portion 386 of arm 384 opens port 388, but the spool remains in the position shown.

Upon rotative movement of the plate 343a to position the control portion 385 of arm 383 over port 387, chamber 389 is pressurized to move spool to the right to cause fluid from the pump to be directed through port 368, groove 365 of the spool, port 367, passages 373 and 371 and chamber 357 for effecting movement of the vane 348, plate 343a, and the agitator in a clockwise direction. Fluid in chamber 358 of the vane motor is exhausted by passages 374 and 372, port 369, groove 364 of the spool, port 370 to the tub.

To provide for the spin-extract rotation of the basket, the electric motor 308 is controlled to reverse the direction of rotation of the pump rotors so that the rotors rotate in a counterclockwise direction. As in the previous embodiments of the invention, the hydraulic lock 331 is released and the fluid is caused to travel in a closed circuit including pump port 337, fluid flow restricting passage 342, valve 334 and pump port 338. The consequent reaction torque provided by hydraulically connecting the pump rotors and housing is effective to provide unitary rotation of the drive shaft 310, pump 318, and the basket 301 for extracting water from the clothes.

It will be apparent from the description of the several modifications of the drive arrangements of the present invention that an important inventive feature resides in the provision of the pump having its housing element, for its pumping element, connected to the clothes container of a fabric-treating machine, and a fluid circuit for the pump and having valving controlling flow of fluid through the circuit and operative to restrict or throttle the fluid flow from the pump to hydraulically lock the pumping and housing elements together to thereby effect a reaction torque in the pump operative to rotate the container by the housing element providing a substantially direct drive connection between the electric motor drive shaft and the container. The gradual throttling of fluid flow from the pump by the control valving is of considerable value in initiating the desired slow rotation of the basket, due to the inertia of its load of wet fabrics, and increasing acceleration of the speed of rotation of the basket to a predetermined speed ratio approximating direct drive to dry the fabrics. In this respect, it is contemplated this pump drive has application also to a centrifugal extractor machine, or a fabric dryer, as well as to the described fabric-treating machines employing liquid washing and extraction operations.

A further important feature of the described drive arrangement is the meritorious contribution to the art involved in considerably simplifying prior hydraulic drive arrangements employed in combined washing and extracting machines by utilizing the pump, instead of a separate hydraulic motor in prior machines, to provide drive of the basket for the extraction operation, in addition to its function of providing fluid under pressure for actuation of the agitator for the washing operation.

While I have shown and described certain presently preferred embodiments of the invention, it will be understood that the invention is not limited thereto since the invention may be embodied within the scope of the appended claims.

I claim:

1. In a fabric-treating machine, a fabric container; a motor having a rotatable drive member; a positive displacement hydraulic pump including a pumping element connected to said drive member, and a housing element for said pumping element and connected to said container; and means for controlling flow of fluid through said pump to initiate rotation and thereafter accelerate rotation of said housing element and thereby said container.

2. In a fabric-treating machine as defined in claim 1 wherein said controlling means restricts the flow of fluid through the pump to induce a reaction torque on said housing element to rotate the housing element and container.

3. In a fabric-treating machine as defined in claim 1 wherein said pump is of the gerotor type, the pumping element being an externally toothed gear connected to the drive member and meshing with an internally toothed ring gear rotatable in the housing element connected to the container.

4. In a fabric-treating machine as defined in claim 1 wherein said controlling means is operative to hydraulically couple said pumping element and said housing element and thereby said drive member and said container.

5. In a fabric-treating machine as defined in claim 2 wherein said motor is a reversible electric motor operative in one direction of rotation to provide actuation of said pump and said controlling means; and valve means operative, during rotation of said motor and thereby said pump in a second direction, to control a second function of said fabric-treating machine.

6. In a fabric-treating machine as defined in claim 1 wherein the fluid is confined to a closed fluid circuit, and said controlling means includes means for increasingly restricting flow of fluid through said circuit to accelerate the speed of rotation of said housing element and thereby said container.

7. In a fabric-treating machine as defined in claim 6 wherein said fluid flow restricting means includes valve means operative to throttle fluid flow through said fluid circuit in proportion to the acceleration of the speed of rotation of said container, said valve means closing to prevent fluid flow through said circuit upon attainment of a predetermined rotational speed of the housing element and container.

8. In a drive arrangement for a clothes-cleaning machine having a clothes container and an agitator in said container, the drive arrangement comprising an electric reversible motor having a drive shaft; driving means for said agitator and operative to actuate said agitator when said motor is operated in a first direction of rotation; driving means for said container and including a pump having a pumping element and a housing element therefor, said housing element being connected to said container and said pumping element being connectible to said drive shaft; and means for controlling flow of fluid through said pump, when said electric motor is operated in a second direction of rotation, to induce rotation of said container by said housing element of said pump.

9. In a drive arrangement as defined in claim 8 wherein said controlling means restricts the flow of fluid through the pump to induce a reaction torque on said housing element to rotate the housing element and container.

10. In a drive arrangement as defined in claim 8 wherein said pump is of the internal gear type, the pumping element being an externally toothed gear connected to the drive member and meshing with an internally toothed ring gear rotatable in the housing element connected to the container.

11. In a drive arrangement as defined in claim 8 wherein said controlling means is operative to hydraulically couple said pumping element and said housing element and thereby said drive member and said container.

12. In a drive arrangement as defined in claim 8 wherein the fluid is confined to a closed fluid circuit, and said controlling means includes means for increasingly restricting flow of fluid through said circuit to accelerate the speed of rotation of said housing and thereby said container.

13. In a drive arrangement as defined in claim 12 wherein said fluid flow restricting means includes valve means operative to throttle fluid flow through said fluid circuit in proportion to the acceleration of the speed of rotation of said container, said valve means closing to prevent fluid flow through said circuit upon attainment of a predetermined rotational speed of the housing element and container.

14. In a hydraulic drive arrangement for a clothes-cleaning machine having a clothes basket and an agitator in said basket, the drive arrangement comprising a pump having a pumping element and a housing element therefor, said housing element being connected to said basket; a motor having a drive member connectible to said pumping element; a hydraulic motor connected to said agitator; first valve means controlling operation of said hydraulic motor to actuate said agitator; and second valve means for controlling flow of fluid through said pump to compel rotation of said housing element and thereby said basket.

15. In a hydraulic drive arrangement for a clothes-cleaning machine as defined in claim 14 wherein said drive arrangement includes a device for preventing rotation of said basket during operation of said hydraulic motor, said device being releasable during operation of said second valve means to permit rotation of said basket by said housing element.

16. In a hydraulic drive arrangement for a clothes-cleaning machine having a clothes basket and an agitator in said basket, the drive arrangement comprising a pump having a pumping element and a housing element therefor, said housing element being connected to said basket; a reversible electric motor having a drive member connectible to said pumping element; a hydraulic motor connected to said agitator; first valve means controlling operation of said hydraulic motor to actuate said agitator when said electric motor is operated in a first direction of rotation; and means, including second valve means, for controlling flow of fluid through said pump, when said electric motor is operated in a second direction, to induce rotation of said housing element and thereby said basket.

17. In a hydraulic drive arrangement for a clothes-cleaning machine as defined in claim 16 wherein said controlling means restricts the flow of fluid through said pump to induce a reaction torque on said housing element and basket.

18. In a hydraulic drive arrangement for a clothes-cleaning machine as defined in claim 16 wherein said pump is of the gerotor type, the pumping element being an externally toothed gear connected to the drive member and meshing with an internally toothed ring gear rotatable in the housing element connected to the basket.

19. In a hydraulic drive arrangement for a clothes-cleaning machine as defined in claim 16 wherein said second valve means is operative to hydraulically couple said pumping and housing elements and thereby said drive member and said basket.

20. In a hydraulic drive arrangement for a clothes-cleaning machine as defined in claim 16 wherein the fluid is confined to flow in a closed circuit, and said second valve means is operative to increasingly restrict flow of fluid through said circuit to accelerate the speed of rotation of said housing element and thereby said basket.

21. In a hydraulic drive arrangement for a clothes-cleaning machine as defined in claim 20 wherein said second valve means closes to prevent fluid flow through said circuit upon attainment of a predetermined rotational speed of said housing element and said basket.

22. In a hydraulic drive arrangement for a clothes-cleaning machine as defined in claim 16 wherein said first valve means is controlled by said agitator.

23. In a hydraulic drive arrangement for a clothes-cleaning machine as defined in claim 16 wherein a device is provided for restraining rotation of said housing element during operation of said electric motor in said first direction, said device being releasable to permit rotation of said housing element during operation of said electric motor in said second direction.

24. In a hydraulic drive arrangement for a clothes-cleaning machine having a clothes basket and an oscillatable agitator in said basket, the drive arrangement comprising a pump having a pumping element and a housing element therefor, said housing element being connected to said basket; a reversible electric motor having a drive shaft connectible to said pumping element; a vane-type hydraulic motor having its vane connected to said agitator; first valve means controlling the flow of hydraulic fluid to alternate sides of the vane of said hydraulic motor to oscillate said agitator, when said electric motor is operated in a first direction of rotation; and means, including second valve means, for restricting flow of fluid through said pump, when said electric motor is operated in the second direction, to induce rotation of said housing element and thereby said basket.

25. In a hydraulic drive arrangement for a clothes-cleaning machine as defined in claim 24 wherein a device prevents rotation of the housing element during operation of said electric motor in said first direction of rotation, and is releasable to permit rotation of said housing element during operation of said electric motor in said second direction of rotation.

26. In a hydraulic drive arrangement for a clothes-cleaning machine as defined in claim 24 wherein said vane controls said first valve means.

27. In a hydraulic drive arrangement for a clothes-cleaning machine as defined in claim 24 wherein the fluid is confined in a closed fluid circuit, and said second valve means increasingly restricts the flow of fluid through said circuit to accelerate the speed of rotation of said housing element and thereby said basket.

28. In a hydraulic drive arrangement for a clothes-cleaning machine as defined in claim 27 wherein said second valve means is operative to throttle fluid flow through said fluid circuit in proportion to the rate of acceleration of the speed of rotation of said basket, said second valve means closing to prevent fluid flow through said circuit upon attainment of a predetermined rotational speed of the housing element and basket.

29. In a hydraulic drive arrangement for a clothes-cleaning machine as defined in claim 24 wherein said hydraulic motor includes a housing providing a fluid chamber for said vane, and said housing connects said vane and said agitator, and control means on said housing controls operation of said first valve means.

30. In a hydraulic drive arrangement for a clothes-cleaning machine as defined in claim 29 wherein said first valve means includes a valve body having passages connected to said fluid chamber, and a spool in said body and shiftable to direct fluid to and from said chamber; and said control means on said housing mechanically controls shifting movement of said spool.

31. In a hydraulic drive arrangement for a clothes-cleaning machine as defined in claim 29 wherein said first valve means includes a valve body having passages connected to said fluid chamber and pressure and exhaust ports, and a spool in said body and disposed between said pressure and exhaust ports and shiftable to direct fluid to and from said chamber; and said control means on said housing is operative to open and close said pressure and exhaust ports to shift said spool.

32. In a hydraulic drive arrangement for a clothes-cleaning machine as defined in claim 24 wherein said agitator has a generally frusto-conical body defining a cavity within said body, and said pump, hydraulic motor, and said first and second valve means are located within said body cavity.

33. In a hydraulic drive arrangement for a clothes-cleaning machine as defined in claim 32 wherein the agitator body provides a housing for the vane motor.

34. In a hydraulic drive arrangement for a clothes-cleaning machine as defined in claim 32 wherein the pump has access to the clothes-cleaning liquid providing the hydraulic fluid for operation of the hydraulic components of the drive arrangement.

35. In a hydraulic drive arrangement for a clothes-cleaning machine as defined in claim 24 wherein an annular plate member provides a housing for said vane motor, and contains spaced cavities, radially outward of the vane of said vane motor, receiving said first and second valve means.

36. In a hydraulic drive arrangement for a clothes-cleaning machine as defined in claim 35 wherein said plate member is provided with fluid passages in communication with said pump, said cavities, and said vane motor.

37. In a hydraulic drive arrangement for a clothes-cleaning machine, a fabric container; a motor having a rotatable drive member; a hydraulic pump including a pumping element connected to said drive member, and a housing element for said pumping element and connected to said container, said pump housing having suction and pressure ports; means defining a passage between said ports; and a valve in said passage and controlling flow of fluid from said pressure port to said suction port, and including a movable member operable by fluid under pressure from said pump pressure port to open said passage, and a spring operative to move said valve member to close said passage against the force of the pressure fluid and restricting flow of fluid through said passage and thereby said pump to provide a reaction force between said pumping element and said housing element effective to rotate said elements.

38. In a hydraulic drive arrangement for a clothes-cleaning machine as defined in claim 37 wherein said valve spring is operative to move said valve member toward its closed position to increasingly restrict fluid flow through said passage and thereby said pump in proportion to the acceleration of the speed of rotation of said pump, said spring actuating said valve member to close said passage to prevent flow of fluid through said passage upon attainment of a predetermined rotational speed of the pump and basket.

39. In a hydraulic drive arrangement for a clothes-cleaning machine having a clothes basket and an oscillatable agitator in said basket, the drive arrangement comprising means defining a fluid sump; a pump having a pumping element and a housing element therefor, said housing element being connected to said basket and having first and second ports; a first valve between said first port and said sump; a reversible electric motor having a drive shaft connectible to said pumping element; a hydraulic motor having a vane connected to said agitator; a second valve controlling flow of fluid in a first circuit, including said sump, said first valve, said ports, and second valve, and said vane motor to said sump, said second valve being operative to direct fluid to alternate sides of the vane of said hydraulic motor to oscillate said agitator, when said electric motor is operated in a first direction of rotation; a third valve; means defining a closed second fluid circuit including said pump ports and said third valve, said third valve being closed, during operation of said electric motor in said first direction, to prevent flow of fluid through said second circuit, said first valve being closed and said third valve being opened during initial fluid flow through said second fluid circuit and thereafter said third valve being operative to increasingly throttle fluid flow through said second circuit and thereby said pump to accelerate the speed of rotation of said housing element and said basket when said electric motor is operated in the second direction.

40. In a hydraulic drive arrangement for a clothes-cleaning machine as defined in claim 39 wherein a fluid pressure operated lock is provided for restraining rotation of said housing element during operation of said electric motor in said first direction, said lock being releasable to permit rotation of said housing element during operation of said electric motor in said second direction.

41. In a drive arrangement for a clothes-cleaning machine having a tub, clothes basket in said tub, and an agitator in said basket, said drive arrangement comprising a reversible electric motor having a drive shaft; a hydraulic transmission having a housing with top and bottom plates closing said housing and having aligned openings therein, said agitator having a shaft extending through the opening in said top plate and said drive shaft extending through the opening in said bottom plate; a vane motor in said housing and including a movable vane connected to said agitator shaft, an annular member engaging said top plate, and a plate member engaging the bottom of said annular member and defining with said top plate a chamber for said vane; a valve block having its upper surface engaging said vane motor plate member and having cavities; first, second, and third valves in said cavities; and a pump including a pumping element, and a housing therefor engaging said bottom plate, said pump housing having suction and pressure ports, and said valve block having passages connecting said pump ports with said valves, and a passage connecting one of said valves with said vane motor chamber; and means connecting said transmission housing and top and bottom plates, said vane motor annular member and plate member, said valve block, pump housing, to said basket.

42. In a drive arrangement for a clothes-cleaning machine as defined in claim 41 including a hydraulic device for preventing rotation of said basket and being in fluid communication with said pump, said device comprising a fluid pressure operated movable member in said transmission bottom plate, and a stop member on said tub engageable with said movable member.

43. In a drive arrangement for a clothes-cleaning machine having a tub, clothes basket in said tub, and an agitator in said basket, said drive arrangement comprising a reversible electric motor having a drive shaft; a hydraulic transmission having a housing with top and bottom plates closing said housing and having aligned openings therein, said top plate being connected to said basket, said agitator having a shaft extending through the opening in said top plate and said drive shaft extending through the opening in said bottom plate; a vane motor in said housing and including a movable vane connected to said agitator shaft, an annular member engaging said top plate, and a plate member engaging the bottom of said annular member and defining with said top plate a chamber for said vane, said annular member having cavities therein spaced radially outwardly thereof; first, second, and third valves in said cavities; and a pump including a pumping element, and a housing therefor engaging said bottom plate, said pump housing having suction and pressure ports, and said vane motor members having passages connecting said pump ports with said valves, and a passage connecting one of said valves with said vane motor chamber; and means connecting said transmission housing and top and bottom plates, said vane motor annular member and plate member, and said pump housing, to said basket.

44. In a drive arrangement for a clothes-cleaning machine as defined in claim 43 including a hydraulic device for preventing rotation of said basket and being in fluid communication with said pump, said device comprising a fluid pressure operated movable member on said transmission bottom plate, and a stop member on said tub engageable with said movable member.

References Cited
UNITED STATES PATENTS

| | | | |
|---|---|---|---|
| 2,574,418 | 11/1951 | Rubano | 68—23 X |
| 2,592,597 | 4/1952 | Pengelly | 68—23 |
| 2,996,908 | 8/1961 | De Zarate | 68—23 |
| 3,242,703 | 3/1966 | Brundage | 68—23 |

WILLIAM I. PRICE, *Primary Examiner.*